United States Patent
Malpede et al.

(10) Patent No.: US 11,306,696 B2
(45) Date of Patent: Apr. 19, 2022

(54) WIND TURBINE BLADE

(71) Applicant: ACT BLADE LIMITED, Edinburgh (GB)

(72) Inventors: Sabrina Maria Malpede, Edinburgh (GB); Donald William Macvicar, Donaghadee (GB)

(73) Assignee: ACT BLADE LIMITED, Edinburgh (GB)

( * ) Notice: Subject to any disclaimer, the term of this patent is extended or adjusted under 35 U.S.C. 154(b) by 126 days.

(21) Appl. No.: 16/465,638

(22) PCT Filed: Dec. 4, 2017

(86) PCT No.: PCT/GB2017/053653
§ 371 (c)(1),
(2) Date: May 31, 2019

(87) PCT Pub. No.: WO2018/100401
PCT Pub. Date: Jun. 7, 2018

(65) Prior Publication Data
US 2019/0338749 A1 Nov. 7, 2019

(30) Foreign Application Priority Data
Dec. 2, 2016 (GB) .................................... 1620543

(51) Int. Cl.
*F03D 1/06* (2006.01)
*F03D 7/02* (2006.01)

(52) U.S. Cl.
CPC ......... *F03D 1/0675* (2013.01); *F03D 1/0633* (2013.01); *F03D 7/0236* (2013.01); *F05B 2240/2211* (2013.01); *F05B 2240/301* (2013.01); *F05B 2240/311* (2013.01)

(58) Field of Classification Search
CPC .... F03D 1/0633; F03D 1/0675; F03D 7/0236; F03D 1/0641; F05B 2240/2211; F05B 2240/301; F05B 2240/311; F05B 2240/31
See application file for complete search history.

(56) References Cited

U.S. PATENT DOCUMENTS

| | | | | |
|---|---|---|---|---|
| 5,150,864 A | * | 9/1992 | Roglin | ...................... B64C 3/44 244/17.25 |
| 6,138,956 A | * | 10/2000 | Monner | .................... B64C 3/48 244/215 |
| 6,465,902 B1 | * | 10/2002 | Beauchamp | .......... F03D 7/0224 290/55 |
| 8,075,278 B2 | * | 12/2011 | Zuteck | .................. F03D 1/0675 416/233 |

(Continued)

FOREIGN PATENT DOCUMENTS

| | | |
|---|---|---|
| CN | 101846034 A | 9/2010 |
| DE | 19741490 A1 | 4/1999 |

(Continued)

*Primary Examiner* — Courtney D Heinle
*Assistant Examiner* — Andrew Thanh Bui
(74) *Attorney, Agent, or Firm* — Fox Rothschild LLP

(57) ABSTRACT

A wind turbine blade comprises a flexible external skin and an internal support structure, together defining an aerodynamic profile of the wind turbine blade. At least a portion of the internal support structure is adjustable to thereby vary the aerodynamic profile.

20 Claims, 6 Drawing Sheets

(56) References Cited

U.S. PATENT DOCUMENTS

| | | | |
|---|---|---|---|
| 8,128,364 B2 * | 3/2012 | Pesetsky | F03D 1/0675 416/91 |
| 8,157,533 B2 * | 4/2012 | Godsk | F03D 7/022 416/240 |
| 8,517,682 B2 * | 8/2013 | Hancock | F03D 7/0232 416/23 |
| 9,033,283 B1 * | 5/2015 | Hemmelgarn | F03D 1/0675 244/219 |
| 9,803,617 B2 * | 10/2017 | Merzhaeuser | F03D 1/0675 |
| 2002/0153729 A1 | 10/2002 | Beauchamp et al. | |
| 2007/0036653 A1 | 2/2007 | Bak et al. | |
| 2009/0074574 A1 | 3/2009 | Godsk et al. | |
| 2009/0290982 A1 | 11/2009 | Madsen et al. | |
| 2010/0028162 A1 | 2/2010 | Vronsky et al. | |
| 2011/0042524 A1 | 2/2011 | Hemmelgarn et al. | |
| 2011/0142629 A1 | 6/2011 | Pesetsky | |
| 2011/0223021 A1 | 9/2011 | Grife et al. | |
| 2014/0119933 A1 | 5/2014 | Bagepalli et al. | |
| 2014/0119937 A1 | 5/2014 | Fang et al. | |
| 2014/0119940 A1 | 5/2014 | Krishnamurthy et al. | |
| 2014/0154090 A1 | 6/2014 | Buravalla et al. | |
| 2015/0198141 A1 | 7/2015 | Hayden et al. | |
| 2015/0369210 A1 | 12/2015 | Merzhaeuser et al. | |
| 2017/0255185 A1 | 9/2017 | Hinshaw | |

FOREIGN PATENT DOCUMENTS

| | | |
|---|---|---|
| DE | 102010028490 A1 | 11/2011 |
| DE | 102014003887 A1 | 9/2015 |
| EP | 1707806 A2 | 10/2006 |
| EP | 2527247 A1 | 11/2012 |
| EP | 2757254 A1 | 7/2014 |
| EP | 2865890 A1 | 4/2015 |
| EP | 2965985 A1 | 1/2016 |
| GB | 2332894 A | 7/1999 |
| WO | 2008070151 A2 | 6/2008 |
| WO | 2017064475 A1 | 4/2017 |
| WO | 2018100401 A1 | 6/2018 |

* cited by examiner

WIND TURBINE BLADE

FIELD OF THE INVENTION

The present invention relates to wind turbines and wind turbine blades.

BACKGROUND TO THE INVENTION

Wind turbines for generating electricity from atmospheric air flows are now well known. Wind turbines typically comprise a rotor having several aerofoil-shaped blades extending from a hub connected to a rotatable shaft. The rotor is oriented into the wind such that as air flows across the wind turbine blades, a lift force is exerted on each blade, causing the rotor and the shaft to rotate, and a generator to thereby generate electricity.

The power generated by a wind turbine is directly dependent on the effective surface area swept by the wind turbine blades as they rotate. Accordingly, wind turbines having longer blades typically generate more power. However, as the blade size increases, so does the weight of the blades. There is therefore a need to develop wind turbine blades made of lighter materials, but which are still strong enough to withstand the forces exerted on a wind turbine blade, for the construction of larger blades. This is particularly true for the development of the large, low-weight blades required for state-of-the-art 10 to 20 MW wind turbines.

The power generated by a wind turbine is also dependent on the aerodynamic shape of the wind turbine blades. The optimal aerodynamic shape of each blade depends on wind conditions and the loads exerted on the blade during operation. There is therefore a need for blades having advanced control features which allow the aerodynamic shape and properties of the blades to be actively controlled in response to changing wind conditions in order to further improve wind turbine efficiency.

Rigid wind turbine blades having trailing edge flaps, which can modify the aerodynamic shape of the blade, are generally known. However, such wind turbine blades typically have limited lifespans due to creep damage. Complex actuation devices are also required to control traditional trailing edge flaps, similar to trailing edge flaps used in aeroplane wings, which typically reduce reliability. Traditional trailing edge flaps also tend to be heavy and slow to respond to actuation. Failure of a trailing edge flap can have significant negative effects on the operation of a wind turbine blade.

Non-traditional, flexible trailing edge flaps have been trialled, but again failure of any such flaps during operation can cause sudden increases in load which must be supported by the rest of the wind turbine blade. Complex and expensive actuation mechanisms are also required. Accordingly, any wind turbine blade incorporating trailing edge flaps must be designed to withstand the maximum possible load experienced when the flaps fail, and so any saving in blade design and manufacture are limited. The addition of trailing edge flaps to existing wind turbine blades is difficult and typically requires a complete structural redesign.

Accordingly, it would be beneficial to provide a wind turbine blade having a lighter and more reliable mechanism for controlling the aerodynamic shape of the blade in use.

SUMMARY OF THE INVENTION

A first aspect of the invention provides a wind turbine blade comprising a flexible external skin and an internal support structure, together defining an aerodynamic profile of the wind turbine blade, wherein at least a portion of the internal support structure is adjustable to thereby vary said aerodynamic profile (e.g. in use).

The flexible external skin of the wind turbine blade and the internal support structure are typically able to move at least partially independently of one another (i.e. as the said at least a portion of the internal support structure is adjusted in use). For example, the flexible external skin is typically able to slide, bend or flow around and/or along at least a portion of the wind turbine blade as the said at least a portion of the internal support structure is adjusted in use (typically without adversely disrupting or damaging the flexible external skin). By sliding, bending or flowing around and/or along a portion of the wind turbine blade, the flexible external skin is able to accommodate any adjustments in the internal structure, thereby varying the aerodynamic profile.

It may be that the at least a portion of the internal support structure which is adjustable to thereby vary the aerodynamic profile is at least a portion of the internal support structure which is movable to thereby vary the said aerodynamic profile. It may be that the at least a portion of the internal support structure which is adjustable to thereby vary the aerodynamic profile is at least a portion of the internal support structure which is controllable to vary the said aerodynamic profile. It may be that the at least a portion of the internal support structure which is adjustable to thereby vary the aerodynamic profile is at least a portion of the internal support structure which is controllably adjustable (e.g. controllably movable) to vary the said aerodynamic profile.

The flexible external skin is typically supported by the internal support structure.

It may be that the flexible external skin is deformable. It may be that adjustment of the at least a portion of the internal support structure cause the aerodynamic profile to vary by deformation of the deformable external skin.

The flexible external skin typically conforms to the shape of the (e.g. the majority of the) internal support structure. The flexible external skin therefore typically flexes to conform with adjustment (e.g. movement) of the at least a portion of the internal support structure.

The flexible external skin typically conforms to the changing (e.g. moving) shape of the internal support structure. Accordingly, as the at least a portion of the internal support structure is adjusted (e.g. moves), no gaps or discontinuities are typically formed in the flexible external skin.

The flexible external skin is typically tensioned. It may be that the flexible external skin is tensioned across the internal support structure. It may be that the flexible external skin is held in tension (e.g. at least in part) by the internal support structure.

The flexible external skin typically retains a taught, smooth profile as the at least a portion of the internal support structure is adjusted (i.e. as the aerodynamic profile is adjusted).

It may be that the internal support structure is adjustable to thereby vary the aerodynamic profile by moving at least a portion of the flexible external skin. It may be that the internal support structure is adjustable to thereby vary the aerodynamic profile by sliding at least a portion of the flexible external skin.

In use, the wind turbine blade is typically connected to the hub of a wind turbine, the hub itself being fixed to a rotatable shaft. It may be that the wind turbine blade is fixedly attached to the hub of the wind turbine. Alternatively, it may be that the wind turbine blade is connected to the hub by way of a blade tilt control mechanism. The wind turbine blade tilt control mechanism typically provides controllable tilt of the wind turbine blade. The wind turbine blade tilt control mechanism may comprise an adjustable pitch and/or yaw mechanism. A plurality of wind turbine blades (for example three such wind turbine blades) each according to the first aspect of the invention are typically connected to (e.g. fixedly attached to) the hub. Together the wind turbine blade(s), the hub and the shaft define a rotor of the wind turbine. Each wind turbine blade is typically oriented such that air flowing towards the rotor and subsequently across the flexible external skin of said wind turbine blade exerts a lift force on said wind turbine blade causing the wind turbine blade, the hub and the shaft to rotate about an axis parallel to, and extending through the centre of, the shaft. The wind turbine typically generates electricity from the resultant rotation of the shaft, for example by the shaft driving an electrical generator.

It is to be understood that the term "wind turbine blade" typically refers to a portion of a wind turbine blade structure which generates lift from a received flow of air. "Wind turbine blade" does not typically encompass other possible portions of a wind turbine blade structure such as connecting portions (for example, portions of the wind turbine blade structure which connect the wind turbine blade structure to the hub). Accordingly, the "length of the wind turbine blade" typically refers to the length of said portion of a wind turbine blade structure which generates lift from a received flow of air and does not typically refer to a length of the wind turbine blade structure including connecting portions (for example, portions of the wind turbine blade structure which connect the wind turbine blade structure to the hub).

The wind turbine blade is typically a wind turbine blade for a horizontal axis wind turbine. Alternatively, the wind turbine blade may be a wind turbine blade for a vertical axis wind turbine.

By adjusting the at least a portion of the internal support structure, and thereby varying the aerodynamic profile of the wind turbine blade, the aerodynamic properties of the wind turbine blade, and the efficiency of a wind turbine of which the wind turbine blades form a part, may be controlled (e.g. improved, for example optimised) for a particular set of wind conditions.

The at least a portion of the internal support structure is typically adjustable to vary the aerodynamic profile of the wind turbine blade in cross-section through the wind turbine blade (e.g. perpendicular to the longitudinal axis of the wind turbine blade).

It may be that the at least a portion of the internal support structure is adjustable to vary a lift profile of the wind turbine blade (i.e. in cross-section through the wind turbine blade).

It may be that the wind turbine blade extends longitudinally between a hub end portion and a blade tip portion. In use, the hub end portion of the wind turbine blade may be connected to the hub of the wind turbine. The wind turbine blade tip portion is typically a portion of the wind turbine blade which is furthest from the hub when in use. It may be that the (e.g. elongate) longitudinal structural support member is wider or broader (e.g. the cross-sectional area of the (e.g. elongate) longitudinal structural support member is greater) towards (i.e. proximate) the hub end portion and that said (e.g. elongate) longitudinal structural support member is narrower or thinner (e.g. the cross-section area of the (e.g. elongate) longitudinal structural support member is smaller) towards (i.e. proximate) the wind turbine blade tip portion. It may be that the length of the wind turbine blade tip portion is less than 5% or less than 2.5% (for example) of the length of the wind turbine blade.

It may be that the at least a portion of the internal support structure is adjustable to vary the aerodynamic profile of the wind turbine blade along at least 10%, or more typically along at least 20%, or even more typically along at least 30%, or even more typically along at least 40%, of the length of the wind turbine blade.

It may be that at least a distal portion of the internal support structure is adjustable to vary the aerodynamic profile of the wind turbine blade. It may be that the at least a distal portion of the internal support structure (i.e. a portion of the internal support structure provided closer to the blade tip portion of the wind turbine blade than the hub end portion of the wind turbine blade, e.g. a blade tip portion of the internal support structure) is adjustable to vary the aerodynamic profile of the wind turbine blade along at least 10%, or more typically along at least 20%, or even more typically along at least 30%, or even more typically along at least 40%, of the length of the wind turbine blade.

It may be that the distal portion of the internal support structure which is adjustable has a centre which is located (i.e. at a point which is) between 60% and 90%, or between 70% and 80%, of the distance (e.g. length) along the wind turbine blade from the hub to the blade tip. It may be that distal portion of the internal support structure extends to (e.g. abuts) the blade tip portion. It may be that the distal portion of the internal support structure extends to (e.g. abuts) the blade tip. It may be that the distal portion of the internal support structure which is adjustable extends to a distance from the blade tip which is within 15%, or within 10%, within 5%, or within 2.5% of the length of the wind turbine blade.

It may be that a portion of the wind turbine blade which is adjustable (e.g. a portion of the aerodynamic profile of the wind turbine blade which is adjustable) extends along at least 10%, or more typically along at least 20%, or even more typically along at least 30%, or even more typically along at least 40%, of the length of the wind turbine blade.

It may be that a distal portion of the wind turbine blade is adjustable to vary the aerodynamic profile of the wind turbine blade. It may be that the distal portion of the wind turbine blade which is adjustable (e.g. a distal portion of the aerodynamic profile of the wind turbine blade which is adjustable) extends along at least 10%, or more typically along at least 20%, or even more typically along at least 30%, or even more typically along at least 40%, of the length of the wind turbine blade. It will be understood that a distal portion of the wind turbine blade is a portion of the wind turbine blade which is provided closer to the blade tip portion of the wind turbine blade than the hub end portion of the wind turbine blade.

It may be that the distal portion of the wind turbine blade which is adjustable has a centre which is located (i.e. at a point which is) between 60% and 90%, or between 70% and 80%, of the distance (e.g. length) along the wind turbine blade from the hub to the blade tip. It may be that distal portion of the wind turbine blade extends to (e.g. abuts) the blade tip portion. It may be that the distal portion of the wind turbine blade extends to (e.g. abuts) the blade tip. It may be that the distal portion of the wind turbine blade which is adjustable extends to a distance from the blade tip which is within 15%, within 10%, within 5%, or within 2.5% of the length of the wind turbine blade.

It may be that the at least a portion of the internal support structure is adjustable along at least 10%, or more typically along at least 20%, or even more typically along at least 30%, or even more typically along at least 40%, of the length of the wind turbine blade.

It may be that the at least a distal portion of the internal support structure is adjustable along at least 10%, or more typically along at least 20%, or even more typically along at least 30%, or even more typically along at least 40%, of the length of the wind turbine blade.

It may be that the at least a portion of the internal support structure is adjustable to vary the aerodynamic profile of the wind turbine blade across at least 10%, or more typically across at least 20%, or even more typically across at least 30%, or even more typically across at least 40%, of the breadth of the wind turbine blade (where the breadth of the wind turbine blade is measured in a direction substantially perpendicular to the longitudinal axis of the wind turbine blade).

It may be that the at least a distal portion of the internal support structure is adjustable to vary the aerodynamic profile of the wind turbine blade across at least 10%, or more typically across at least 20%, or even more typically across at least 30%, or even more typically across at least 40%, of the breadth of the wind turbine blade (where the breadth of the wind turbine blade is measured in a direction substantially perpendicular to the longitudinal axis of the wind turbine blade).

It may be that a portion of the wind turbine blade which is adjustable (e.g. a portion of the aerodynamic profile of the wind turbine blade which is adjustable) extends across at least 10%, or more typically across at least 20%, or even more typically across at least 30%, or even more typically across at least 40%, of the breadth of the wind turbine blade.

It may be that a distal portion of the wind turbine blade which is adjustable (e.g. a distal portion of the aerodynamic profile of the wind turbine blade which is adjustable) extends across at least 10%, or more typically across at least 20%, or even more typically across at least 30%, or even more typically across at least 40%, of the breadth of the wind turbine blade.

It may be that the at least a portion of the internal support structure is adjustable across at least 10%, or more typically across at least 20%, or even more typically across at least 30%, or even more typically across at least 40%, of the breadth of the wind turbine blade.

It may be that the at least a distal portion of the internal support structure is adjustable across at least 10%, or more typically across at least 20%, or even more typically across at least 30%, or even more typically across at least 40%, of the breadth of the wind turbine blade.

It may be that only the distal portion of the internal support structure is adjustable to vary the aerodynamic profile of the wind turbine blade (and the remainder of the internal support structure is not adjustable, i.e. has a fixed structure). It may be that only the distal portion of the wind turbine blade is adjustable to vary the aerodynamic profile of the wind turbine blade (and the remainder of the wind turbine blade is not adjustable, i.e. has a fixed structure). By making the distal portion of the internal support structure and/or wind turbine blade adjustable (and in particular by making only the distal portion of the internal support structure and/or wind turbine blade adjustable), control of the aerodynamic properties of the wind turbine blade may be achieved when in use as part of a wind turbine without requiring pitching of the entire wind turbine blade (i.e. rotation of the wind turbine blade about its longitudinal axis). Heavy machinery required to control blade pitch is therefore typically not required, reducing the load on the wind turbine. Improvements in lift generation may also be achieved by modifying the shape of the wind turbine blade which could not be achieved simply by pitching a rigid wind turbine blade.

It may be that the wind turbine blade comprises a distal region which is adjustable to vary the aerodynamic profile of the wind turbine blade and a proximal region which is not adjustable (i.e. fixed). The flexible external skin typically extends over both the fixed proximal region and the adjustable distal region. The flexible external skin extending over both the fixed proximal region and the adjustable distal region typically comprises a continuous piece of fabric. The fixed proximal region typically extends along (i.e. has a length of) at least 10% of the length of the wind turbine blade (i.e. from the hub to the blade tip). The adjustable distal region typically extends along (i.e. has a length of) at least 10% of the length of the wind turbine blade (i.e. from the hub to the blade tip).

It may be that the flexible external skin comprises a suction surface and a pressure surface both extending between a leading edge and a trailing edge of the wind turbine blade. Each of the suction surface and the pressure surface typically form part of the aerodynamic profile of the wind turbine blade. In particular, the suction surface and the pressure surface typically form a substantial part of the (e.g. the entire) lift profile of the wind turbine blade. When air (i.e. wind) flows over the suction surface and the pressure surface of the wind turbine blade from the leading edge to the trailing edge, a pressure gradient is typically generated between said suction surface and said pressure surface, resulting in a lift force acting on the wind turbine blade. A torque, therefore, is typically exerted on the hub of the wind turbine, thereby causing the hub to rotate.

It may be that the at least a (e.g. distal) portion of the internal support structure is adjustable to vary one or more dimensions of the suction surface. For example, it may be that the at least a (e.g. distal) portion of the internal support structure is adjustable to vary a breadth of the suction surface (i.e. in a direction perpendicular to the longitudinal axis of the wind turbine blade). It may be that the at least a (e.g. distal) portion of the internal support structure is adjustable to vary the curvature (i.e. a camber) of the suction surface.

It may be that the at least a (e.g. distal) portion of the internal support structure is adjustable to vary one or more dimensions of the pressure surface. For example, it may be that the at least a (e.g. distal) portion of the internal support structure is adjustable to thereby vary a breadth of the pressure surface (i.e. in a direction perpendicular to the longitudinal axis of the wind turbine blade). It may be that the at least a (e.g. distal) portion of the internal support structure is adjustable to vary the curvature (i.e. a camber) of the pressure surface.

It may be that the at least a (e.g. distal) portion of the internal support structure is adjustable to vary a ratio of one or more dimensions of the suction surface to one or more dimensions of the pressure surface. It may be that the at least a (e.g. distal) portion of the internal support structure is adjustable to vary a ratio of the breadth of the suction surface (i.e. in a direction perpendicular to the longitudinal axis of the wind turbine blade) to the breadth of the pressure surface (i.e. in a direction perpendicular to the longitudinal axis of the wind turbine blade).

It may be that the at least a (e.g. distal) portion of the internal support structure is adjustable to vary an orientation of the suction surface relative to the pressure surface. It may be that the at least a (e.g. distal) portion of the internal support structure is adjustable to vary an angle between the suction surface and the pressure surface. It may be that the at least a (e.g. distal) portion of the internal support structure is adjustable to vary an angle between a tangent to the suction surface and a tangent to the pressure surface. It may be that the at least a (e.g. distal) portion of the internal support structure is adjustable to vary the angle between the tangent to the suction surface and the tangent to the pressure surface at the trailing edge.

It may be that the at least a (e.g. distal) portion of the internal support structure is adjustable to vary an orientation of the trailing edge with respect to the leading edge. It may be that the at least a (e.g. distal) portion of the internal support structure is adjustable to vary a distance between the trailing edge and the leading edge.

It may be that one (e.g. distal) portion of the internal support structure is adjustable to thereby vary said aerodynamic profile. It may be that more than one (e.g. distal) portion of the internal support structure is adjustable to thereby vary said aerodynamic profile. It may be that a plurality of (e.g. distal) portions of the internal support structure is adjustable to thereby vary said aerodynamic profile.

It may be that the internal support structure comprises a (e.g. elongate) longitudinal structural support member. It may be that said (e.g. elongate) longitudinal structural support member extends (e.g. longitudinally) along at least a majority of the length of the wind turbine blade. It may be that said (e.g. elongate) longitudinal structural support member extends (e.g. longitudinally) along the entire length of the wind turbine blade.

The (e.g. elongate) longitudinal structural support member may be a beam, rod, pole or cylinder. It may be that the (e.g. elongate) longitudinal structural support member has a substantially elliptical cross section. For example, it may be that the (e.g. elongate) longitudinal structural support member has a substantially elliptical cross section in a plane perpendicular to a longitudinal axis of said (e.g. elongate) longitudinal structural support member. An (e.g. elongate) longitudinal structural support member having a substantially elliptical cross section is typically torsionally stiff.

It may be that the width and/or breadth of the (e.g. elongate) longitudinal structural support member varies along the length of said (e.g. elongate) longitudinal structural support member. That is to say, the cross-sectional area of the (e.g. elongate) longitudinal structural support member (taken in a plane perpendicular to the longitudinal axis) may vary along the length of the (e.g. elongate) longitudinal structural support member.

It may be that the cross-sectional shape of the (e.g. elongate) longitudinal structural support member varies along its length. It may be that the (e.g. elongate) longitudinal structural support member has a substantially circular cross section towards (i.e. proximate) the hub end portion and a substantially elliptical cross section towards (i.e. proximate) the wind turbine blade tip portion.

It may be that the (e.g. elongate) longitudinal structural support member is hollow.

It may be that the (e.g. elongate) longitudinal structural support member comprises (e.g. is formed from) carbon fibre or carbon composite materials.

It may be that the internal support structure comprises at least one transverse structural support member.

It may be that the internal support structure comprises a plurality of transverse structural support members.

Each transverse structural support member may be arranged along the length of said (e.g. elongate) longitudinal structural support member. The transverse structural support members may be arranged along a distal portion of the (e.g. elongate) longitudinal structural support member.

The or each transverse structural support member may comprise a rigid transverse support panel.

The or each transverse structural support member (e.g. the or each transverse support panel) may be fixedly attached to or integral with the (e.g. elongate) longitudinal structural support member. For example, the or each transverse support panel may comprise a hollow aperture such that said transverse support panel may be slid onto the (e.g. elongate) longitudinal structural support member during manufacture of the wind turbine blade. Said hollow aperture may be configured (e.g. dimensioned) for an interference fit with a portion of the (e.g. elongate) longitudinal structural support member. The or each transverse support panel may comprise one or more flanges which may engage with and/or be fixedly attached to a surface of the (e.g. elongate) longitudinal structural support member. Alternatively, the or each transverse support panel may be integrally formed with the (e.g. elongate) longitudinal structural support member.

The or each transverse structural support member typically extends (e.g. radially) in a direction substantially perpendicular to the surface of the (e.g. elongate) longitudinal structural support member (i.e. in a direction substantially perpendicular to the longitudinal axis of the (e.g. elongate) longitudinal structural support member). It may be that the or each transverse structural support member extends away from the (e.g. elongate) longitudinal structural support member in a plane substantially perpendicular to the longitudinal axis of the (e.g. elongate) longitudinal structural support member.

Each of the plurality of transverse structural support members is typically spaced apart from each other transverse structural support member along the length of the (e.g. elongate) longitudinal structural support member. For example, the shortest distance between adjacent transverse structural support members may be constant along the length of the (e.g. elongate) longitudinal structural support member.

The or each transverse structural support member typically contributes to the aerodynamic shape (i.e. profile) of the wind turbine blade. The or each transverse structural support member typically contributes to the aerodynamic shape (i.e. profile) of the wind turbine blade in a respective plane perpendicular to the (e.g. elongate) longitudinal structural support member (i.e. in the plane of each said transverse structural support member). The or each transverse structural support member typically contributes to (i.e. in part defines) a local portion of the aerodynamic shape (i.e. profile) of the wind turbine blade. It may be that the or each transverse structural support member typically contribute to (i.e. in part defines) a distal portion of the aerodynamic shape (i.e. profile) of the wind turbine blade.

The flexible external skin is typically supported by (in part) a supporting edge of the or each transverse structural support member. An aerodynamic shape (i.e. profile) of the or each transverse structural support member typically comprises a suction edge portion, a pressure edge portion, a leading edge portion and a trailing edge portion of each supporting edge. The flexible external skin typically extends across one or more portions of the supporting edge of the or each transverse structural support member. Accordingly, portions of the flexible external skin supported by pressure edge portions of supporting edges typically define the pressure surface of the flexible external skin. Portions of the flexible external skin supported by suction edge portions of supporting edges typically define the suction surface of the flexible external skin. Portions of the flexible external skin supported by leading edge portions of supporting edges typically define the leading edge of the flexible external skin. Portions of the flexible external skin supported by trailing edge portions of supporting edges typically define the trailing edge of the flexible external skin.

The cross-sectional area (in a plane perpendicular to the longitudinal axis of the (e.g. elongate) longitudinal structural support member, i.e. in the respective plane of each transverse structural support member) of each transverse structural support member typically varies along the length of the (e.g. elongate) longitudinal structural support member. For example, it may be that the cross-sectional area of those transverse structural support members towards (i.e. proximate) the hub end portion of the (e.g. elongate) longitudinal structural support member is greater and that the cross-sectional area of those transverse structural support members towards (i.e. proximate) the wind turbine blade tip portion (i.e. the distal portion) of the (e.g. elongate) longitudinal structural support member is smaller.

It may be that the shape (i.e. the profile) of each of the plurality of transverse structural support members in a respective plane perpendicular to the longitudinal axis of the (e.g. elongate) longitudinal structural support member (i.e. in the plane of each transverse structural support member) varies along the length of the (e.g. elongate) longitudinal structural support member. The plurality of transverse structural support members therefore typically contribute to the aerodynamic shape (i.e. profile) of the wind turbine blade along the majority (e.g. the entirety) of its length.

By surrounding the (e.g. elongate) longitudinal structural support member with the plurality of transverse structural support members and/or the flexible external skin, the (e.g. elongate) longitudinal structural support member is not exposed to the surrounding atmosphere and the risk of lightning striking the (e.g. elongate) longitudinal structural support member is reduced (compared to wind turbine blades having structural support members provided on an external surface thereof).

It may be that at least a portion of the transverse structural support member, or at least a portion of one or more of the plurality of transverse structural support members, is movable to (i.e. thereby) vary the (e.g. local) aerodynamic profile of the wind turbine blade. It may be that a single portion (i.e. only one portion) of the transverse structural support member, or a single portion (i.e. only one portion) of one or more of the plurality of transverse structural support members, is movable to (i.e. thereby) vary the (e.g. local) aerodynamic profile of the wind turbine blade. The transverse structural support member, or one or more of the plurality of transverse structural support members, may be an articulated transverse structural support member. It may be that at least a portion, or the single portion, of the (e.g. articulated) transverse structural support member, or at least a portion, or the single portion, of one or more of the plurality of (e.g. articulated) transverse structural support members, is movable to vary the aerodynamic profile of the wind turbine blade in cross-section in a plane substantially perpendicular to the longitudinal axis of the wind turbine blade.

It may be that the transverse structural support member, or one or more (e.g. each) of the plurality of transverse structural support members, is formed of (e.g. consists of) a first portion which is fixed (i.e. not adjustable or movable) and a second portion which is rotatably or hingedly mounted on the first portion. It may be that the transverse structural support member, or one or more (e.g. each) of the plurality of transverse structural support members, has a single pivot point (e.g. an axis of rotation or a hinge) about which the second portion may pivot.

In embodiments in which a single (i.e. only one) portion of the transverse structural support member, or of the one or more of the plurality of transverse structural support members, is movable, the construction of the internal support structure is simplified and control of movement of the said movable portion or portions is made easier.

It may be that the transverse structural support member, or one or more of the plurality of transverse structural support members, comprises a fixed portion and a movable portion. It may be that the transverse structural support member, or one or more of the plurality of transverse structural support members, comprises a fixed portion and a single (i.e. only one) movable portion. The fixed portion is typically fixedly attached to or integral with the (e.g. elongate) longitudinal structural support member (e.g. by way of the hollow aperture). The (e.g. single) movable portion is typically movably coupled to (e.g. mounted on) the fixed portion such that the said movable portion is movable relative to the fixed portion. The (e.g. single) movable portion is typically controllably movable relative to the fixed portion.

The (e.g. single) movable portion may be rotatably coupled to (e.g. mounted on) the fixed portion, such that the said movable portion may be rotated relative to the fixed portion. The (e.g. single) movable portion is typically controllably rotatable relative to the fixed portion. The (e.g. single) movable portion may be therefore be a rotatable portion of the said transverse structural support member. The (e.g. single) movable portion (i.e. the rotatable portion) may be rotatable in a plane substantially perpendicular to the longitudinal axis of the wind turbine blade (i.e. substantially parallel to a plane in which the transverse structural support member lies).

The (e.g. single) movable portion (i.e. the rotatable portion) may be mounted on the fixed portion by way of a pivot about which the said movable portion (i.e. the rotatable portion) is rotatable. The pivot may be a pin or a bolt.

The (e.g. single) movable portion may be movable between first and second positions. The (e.g. single) movable portion may be continuously movable between said first and second positions. The first and second positions may define limits to the extent of movement of the (e.g. single) movable portion relative to the fixed portion. Alternatively, the (e.g. single) movable portion may be movable between more than two fixed positions.

The (e.g. single) movable portion (i.e. the rotatable portion) may be rotatable between first and second orientations. The (e.g. single) movable portion (i.e. the rotatable portion) may be continuously rotatable between said first and second orientations. The first and second orientations may define limits to the extent of rotation of the (e.g. single) movable portion (i.e. the rotatable portion) relative to the fixed portion. Alternatively, the (e.g. single) movable portion (i.e. the rotatable portion) may be movable between more than two fixed orientations.

The (e.g. single) movable portion (i.e. the rotatable portion) may be movable (e.g. rotatable) through a total angular range of at least 5°, more typically at least 10°, even more typically at least 15°, or even more typically at least 20°. For example, the (e.g. single) movable portion (i.e. the rotatable portion) may be movable (e.g. rotatable) by at least 2.5°, or more typically at least 5°, even more typically at least 7.5°, or even more typically at least 10°, away from (e.g. above or below) a neutral axis. Rotation of the (e.g. single) movable portion (i.e. the rotatable portion) is typically about an axis of rotation substantially parallel to the longitudinal axis of the wind turbine blade.

It may be that the or each (e.g. articulated) transverse structural support member is rotatably coupled to (e.g. rotatably mounted on) the longitudinal structural support member such that the or each said transverse structural support member is rotatable about said longitudinal structural support member.

It may be that a portion of each articulated transverse structural support member is movable to vary a respective portion of the aerodynamic profile of the wind turbine blade. It may be that a single (i.e. only one) portion of each articulated transverse structural support member is movable to vary a respective portion of the aerodynamic profile of the wind turbine blade. For example, it may be that the internal support structure comprises a plurality of articulated transverse structural support members arranged along the length of the wind turbine blade, and that a (e.g. single) portion of each said articulated transverse structural support member is movable to vary a respective portion of the aerodynamic profile of the wind turbine blade at a corresponding location along its length.

It may be that each articulated transverse structural support member is formed of (e.g. consists of) a first portion which is fixed (i.e. not adjustable or movable) and a second portion which is rotatably or hingedly mounted on the first portion. It may be that each articulated transverse structural support member has a single pivot point (e.g. an axis of rotation or a hinge) about which the second portion may pivot.

It may be that a portion of the wind turbine blade (i.e. an articulated portion of the wind turbine blade) is articulated. It may be that a distal portion of the wind turbine blade (i.e. an articulated distal portion of the wind turbine blade) is articulated. The (e.g. distal) articulated portion of the wind turbine blade typically comprises (e.g. is) a portion of the wind turbine blade which is (e.g. controllably) adjustable (i.e. movable, for example rotatable). The (e.g. distal) articulated portion of the wind turbine blade is typically movable (e.g. rotatable) relative to the rest of the wind turbine blade (i.e. relative to a non-articulated portion of the wind turbine blade).

The flexible external skin typically wraps around both the (e.g. distal) articulated portion of the wind turbine blade and a non-articulated portion of the wind turbine blade.

It may be that the (e.g. distal) articulated portion of the wind turbine blade comprises (e.g. is formed by) at least one (e.g. articulated) transverse structural support member. It may be that the (e.g. distal) articulated portion of the wind turbine blade comprises (e.g. is formed by) the plurality of (e.g. articulated) transverse structural support members.

It may be that the (e.g. distal) articulated portion of the wind turbine blade extends along a portion of the length of the wind turbine blade. It may be that the (i.e. distal) articulated portion of the wind turbine blade is provided towards the wind turbine blade tip portion. It may be that the (i.e. distal) articulated portion of the wind turbine blade is provided closer to the wind turbine blade tip portion than the hub end portion. The blade tip does not typically form part of the (e.g. distal) articulated portion of the wind turbine blade.

It may be that the (e.g. distal) articulated portion of the wind turbine blade extends along at least 10%, more typically along at least 20%, or even more typically along at least 30%, or even more typically along at least 40%, of the length of the wind turbine blade.

It may be that the (e.g. distal) articulated portion of the wind turbine blade extends across at least 10%, more typically across at least 20%, or even more typically across at least 30%, or even more typically across at least 40%, of the breadth of the wind turbine blade.

It may be that the (e.g. distal) articulated portion of the wind turbine blade comprises (e.g. extends along) a portion of the trailing edge of the wind turbine blade. The articulated portion of the wind turbine blade may function as a wind turbine blade flap.

The (e.g. distal) articulated portion of the wind turbine blade (e.g. the wind turbine blade flap) may be movable (e.g. flappable) between at least first and second configurations. The (e.g. distal) articulated portion of the wind turbine blade (e.g. the wind turbine blade flap) may be movable (e.g. flappable) continuously between said at least first and second configurations. The (e.g. distal) articulated portion of the wind turbine blade (e.g. the wind turbine blade flap) may be movable (e.g. flappable) through a total angular range of at least 5°, more typically at least 10°, even more typically at least 15°, or even more typically at least 20°, about an axis of rotation extending substantially parallel to the longitudinal axis of the wind turbine blade. For example, the (e.g. distal) articulated portion of the wind turbine blade (e.g. the wind turbine blade flap) may be movable (e.g. flappable) by at least 2.5°, or more typically at least 5°, even more typically at least 7.5°, or even more typically at least 10°, away from (e.g. above or below) a neutral axis extending substantially parallel to the longitudinal axis of the wind turbine blade. The angular range may vary along a length of the (e.g. distal) articulated portion. The wind turbine blade may comprise more than one articulated portion. Said more than one articulated portions may be discrete (i.e. separated from one another). Alternatively, one or more of said more than one articulated portions may overlap with one another.

The wind turbine blade may comprise a support structure control system configured (e.g. operable) to control adjustment of the at least a portion of the internal support structure which is adjustable to vary the aerodynamic profile of the wind turbine blade. It may be that the support structure control system is configured (e.g. operable) to control movement of the (e.g. at least a portion of the) (e.g. articulated) transverse structural support member, or (e.g. the at least a portion of) one or more of the plurality of (e.g. articulated) transverse structural support members, to vary the aerodynamic profile of the wind turbine blade. It may be that the support structure control system is configured (e.g. operable) to control movement of the (e.g. single) movable portion of the (e.g. articulated) transverse structural support member, or of the one or more of the plurality of (e.g. articulated) transverse structural support members, relative to the fixed portion of said (e.g. articulated) transverse support member. It may be that the support structure control system is configured (e.g. operable) to control rotation of the (e.g. single) movable portion (i.e. the rotatable portion) of the (e.g. articulated) transverse structural support member, or of the one or more of the plurality of (e.g. articulated) transverse structural support members, relative to the fixed portion of said (e.g. articulated) transverse support member. It may be that the support structure control system is configured (e.g. operable) to control rotation of the or each (e.g. articulated) transverse structural support members relative to the longitudinal structural support member.

It may be that the support structure control system is configured (e.g. operable) to control movement of the (e.g. distal) articulated portion of the wind turbine blade. It may be that the support structure control system is configured (e.g. operable) to control movement (e.g. flapping) of the wind turbine blade flap.

It may be that at least one of the (e.g. articulated) transverse structural support members is individually controllable. It may be that at least two of the (e.g. articulated) transverse structural support members are individually controllable. It may be that at least three of the (e.g. articulated) transverse structural support members are individually controllable. It may be that at least four of the (e.g. articulated) transverse structural support members are individually controllable. It may be that at least five of the (e.g. articulated) transverse structural support members are individually controllable. It may be that each of the (e.g. articulated) transverse structural support members is individually controllable.

The wind turbine blade (e.g. the support structure control system of the wind turbine blade) may comprise a controller coupled to each of the individually controllable (e.g. articulated) transverse structural support members. The controller may be coupled to said (e.g. articulated) transverse structural support members by way of one or more control cables.

By providing two or more individually controllable (e.g. articulated) transverse structural support members, the adjustment (i.e. movement, for example angle of rotation) of each said (e.g. articulated) transverse structural support member may be determined independently. This typically allows the shape of the wind turbine blade along its length to be adjusted locally. For example, the (i.e. angular) twist of the wind turbine blade along its length may be varied.

It may be that the wind turbine blade (e.g. the support structure control system of the wind turbine blade) comprises a controller directly coupled to one or more, but not all, of the (e.g. articulated) transverse structural support members. For example, it may be that the plurality of (e.g. articulated) transverse structural support members comprises one or more slave support members and one or more master support members. The controller is typically directly coupled to the one or more master support members. The controller is typically not directly coupled to the one or more slave support members. Each of the one or more slave support members may be coupled to the one or more master support members so that adjustment (i.e. movement, e.g. rotation) of the master support members causes corresponding adjustment (i.e. movement, e.g. rotation) of the slave support members.

The one or more slave support members may be directly coupled to the one or more master support members. For example, each of the one or more slave support members may be connected to at least one of the one or more master support members. Each of the one or more slave support members may be connected to at least one of the one or more master support member by one or more connecting rods.

Additionally or alternatively, the one or more slave support members may be indirectly coupled to the one or more master support members. For example, the one or more slave support members may be indirectly coupled to the one or more master support members through the flexible external skin. It may be that adjustment (i.e. movement, e.g. rotation) of at least one of the one or more master support members causes adjustment (i.e. movement) of the flexible external skin, thereby causing corresponding adjustment (i.e. movement, e.g. rotation) of at least one of the one or more slave support members.

The controller may be located in the wind turbine blade. Alternatively, the controller may be located in the wind turbine hub.

The wind turbine may comprise one or more sensors. The one or more sensors may be coupled to (e.g. electrically connected to) the controller. The controller may determine adjustments (e.g. movements) of the internal support structure based at least in part on one or more sensor outputs from the one or more sensors. The controller may therefore reconfigure (e.g. optimise) the wind turbine blade in response to changing conditions (e.g. wind conditions and/or applied loads).

One or more of the one or more sensors (e.g. each of the one or more sensors) may be provided in or on the wind turbine blade. Additionally or alternatively, one or more of the one or more sensors (e.g. each of the one or more sensors) may be provided in or on the hub. Additionally or alternatively, one or more of the one or more sensors (e.g. each of the one or more sensors) may be provided in or on a nacelle of the wind turbine blade. The nacelle is typically a housing which contains the rotor and the electrical generator.

The one or more sensors may comprise load sensors operable (i.e. configured) to determine one or more loads acting on the wind turbine blade (i.e. in use). Such load sensors may be operable (i.e. configured) to determine one or more loads acting on the flexible external skin and/or the internal support structure (e.g. the longitudinal structural support member and/or one or more of the transverse structural support members) and/or the control system. For example, load sensors may comprise strain sensors operable (i.e. configured) to measure strains in the flexible external skin and/or the internal support structure (e.g. the longitudinal structural support member and/or one or more of the transverse structural support members) and/or the control system (e.g. in control cables).

The one or more sensors may comprise one or more wind-characterising sensors. Wind-characterising sensors are typically operable (i.e. configured) to determine one or more properties of an approaching wind field. Wind-characterising sensors may be operable (i.e. configured) to determine wind velocity (i.e. wind speed and wind direction). Wind-characterising sensors may comprise LIDAR sensors.

It may be that the flexible external skin comprises tensioned fabric. The flexible external skin comprising tensioned fabric is typically light-weight (e.g. because the fabric is typically light-weight). Accordingly, the overall weight of the wind turbine blade is reduced in comparison to wind turbine blades having outer surfaces made of typical rigid structural materials. This permits use of larger and/or longer blades (for a given blade weight tolerance) which can exert larger torques on the shaft and which can therefore lead to greater wind turbine power output.

It may be that the flexible external skin consists substantially of tensioned fabric. It may be that a majority of the flexible external skin consists of tensioned fabric. It may be that the flexible external skin consists entirely of tensioned fabric. It may be that said external skin is an external tensioned fabric skin. Tensioned fabric typically conforms better to the aerodynamic profile of the wind turbine blade (e.g. of the internal support structure). Tensioned fabric also typically better maintains an aerodynamic profile in use.

It will be understood that the term "fabric" is used to refer to any suitable fabrics, textiles, cloths, laminates or combinations thereof suitable for the construction of the flexible external skin of a wind turbine blade. A fabric may be any flexible woven or non-woven material comprising a network of natural and/or artificial fibres. Said natural and/or artificial fibres may be woven, knitted, crocheted, knotted, felted, bonded or glued together.

It may be that said external skin comprises a thin (tensioned fabric) sheet. It may be that said sheet is thin relative to the dimensions (e.g. the width and/or the breadth) of the wind turbine blade.

It may be that the flexible external skin comprises an external wind-receiving surface. It may be that said external wind-receiving surface consists substantially of tensioned fabric. It may be that a majority of the external wind-receiving surface consists of tensioned fabric. It may be that the external wind-receiving surface consists entirely of tensioned fabric. It may be that said external wind-receiving surface is an external tensioned fabric wind-receiving surface.

It may be that external skin comprises an interior surface proximate the internal support structure. It may be that said interior surface consists substantially of tensioned fabric. It may be that a majority of the interior surface consists of tensioned fabric. It may be that the interior surface consists entirely of tensioned fabric. It may be that said interior surface is an interior tensioned fabric surface. It may be that the flexible external skin consists of tensioned fabric across a complete thickness of said external skin from the external wind-receiving surface to the interior surface proximate the internal support structure. The greater the proportion of the flexible external skin which consists of tensioned fabric, typically the lighter the wind turbine blade.

It may be that the flexible external skin consists of one (continuous) fabric sheet. It may be that said (continuous) fabric sheet is formed as a (continuous) tube or sock. It may be that first and second (parallel) edges of said (continuous) fabric sheet are connected to one another along the majority of the length of the wind turbine blade to thereby form said external skin (i.e. the (continuous) tube or sock). For example, it may be that said first and second (parallel) edges are bonded, glued, stitched or otherwise attached to one another along the majority of the length of the wind turbine blade to form said external skin (i.e. the (continuous) tube or sock).

It may be that the flexible external skin is formed of fabric continuously along the majority of the length of the wind turbine blade. It may be that the flexible external skin is formed by two or more fabric panels connected to one another around the wind turbine blade, each of said two or more fabric panels extending along a respective portion of the majority of the length of the wind turbine blade. For example, it may be that said two or more fabric panels are bonded, glued, stitched or otherwise attached to one another around the wind turbine blade. It may be that the flexible external skin is formed by three or more fabric panels connected to one another around the wind turbine blade, each of said two or more fabric panels extending along a respective portion of the majority of the length of the wind turbine blade. It may be that the flexible external skin is formed by four or more fabric panels connected to one another around the wind turbine blade, each of said two or more fabric panels extending along a respective portion of the majority of the length of the wind turbine blade. It may be that the flexible external skin is formed by five or more fabric panels connected to one another around the wind turbine blade, each of said two or more fabric panels extending along a respective portion of the majority of the length of the wind turbine blade.

It may be that the flexible external skin comprises tensioned fabric which extends (longitudinally) along at least 70%, more typically along at least 80%, more typically at least along 90%, or even more typically along at least 95%, of the length of the wind turbine blade.

It may be that the flexible external skin consists of two or more fabric panels connected to one another along the majority of the length of the wind turbine blade. It may be that the flexible external skin consists of three or more fabric panels connected to one another along the majority of the length of the wind turbine blade.

It may be that the flexible external skin consists of four or more fabric panels connected to one another along the majority of the length of the wind turbine blade. It may be that the flexible external skin consists of five or more fabric panels connected to one another along the majority of the length of the wind turbine blade.

It may be that the flexible external skin consists of ten or fewer fabric panels connected to one another along the majority of the length of the wind turbine blade. It may be that the flexible external skin consists of nine or fewer fabric panels connected to one another along the majority of the length of the wind turbine blade. It may be that the flexible external skin consists of eight or fewer fabric panels connected to one another along the majority of the length of the wind turbine blade. It may be that the flexible external skin consists of seven or fewer fabric panels connected to one another along the majority of the length of the wind turbine blade. It may be that the flexible external skin consists of six or fewer fabric panels connected to one another along the majority of the length of the wind turbine blade.

It may be that said two or more, three or more, four or more, five or more, ten or fewer, nine or fewer, eight or fewer, seven or fewer, or six or fewer fabric panels are bonded, glued, stitched or otherwise attached to one another along the majority of the length of the wind turbine blade to form said external skin (i.e. the (continuous) tube or sock).

It may be that each of said two or more, three or more, four or more, five or more, ten or fewer, nine or fewer, eight or fewer, seven or fewer, or six or fewer fabric panels has a constant width along the majority of the length of the wind turbine blade. Alternatively, it may be that one or more of said two or more, three or more, four or more, five or more, ten or fewer, nine or fewer, eight or fewer, seven or fewer, or six or fewer fabric panels has a variable width along with majority of the length of the wind turbine blade. For example, it may be that one or more of said two or more, three or more, four or more, five or more, ten or fewer, nine or fewer, eight or fewer, seven or fewer, or six or fewer fabric panels tapers (in width) along a portion (e.g. a majority) of the length of the wind turbine blade. It may be that some or each of said two or more, three or more, four or more, five or more, ten or fewer, nine or fewer, eight or fewer, seven or fewer, or six or fewer fabric panels differ in length. It may be that some of said two or more, three or more, four or more, five or more, ten or fewer, nine or fewer, eight or fewer, seven or fewer, or six or fewer fabric panels extend along a majority of the length of the wind turbine blade while the others of said two or more, three or more, four or more, five or more, ten or fewer, nine or fewer, eight or fewer, seven or fewer, or six or fewer fabric panels extend only along a portion of the length of the wind turbine blade, said portion being less than said majority of the length of the wind turbine blade.

It may be that the fabric comprises a laminate textile comprising alternating layers of fabrics. Said fabrics may be woven fabrics and/or non-woven fabrics. Said laminate textile or one or more of said woven or non-woven fabrics typically has one or more of the following advantageous properties: a high strength to weight ratio, a high stiffness to weight ratio, a high tear resistance, a high abrasion and puncture resistance, a low air porosity over the temperature range −10° C. to 40° C., low or zero water permeability, low light permeability, low radiant heat absorption, low creep, and/or low or zero stretch. Said laminate textile or one or more of said woven or non-woven fabrics is typically bondable to create joints. Said laminate textile or one or more of said woven or non-woven fabrics is typically fire retardant.

It may be that the laminate textile comprises two or more layers. It may be that the laminate textile comprises woven aramid (e.g. Technora) materials. It may be that the laminate textile comprises liquid crystal polymer (e.g. Vectran) materials. It may be that the laminate textile comprises one or more resin polyethylene terephthalate (e.g. Mylar) sheets. It may be that the laminate textile comprises a scrim material (e.g. a woven aramid scrim such as Technora scrim). A scrim material typically comprises a coarsely-woven (i.e. a loose weave) fabric and typically provides the laminate textile with strength. It may be that the laminate comprises a UV protection film such as a polyvinyl fluoride film (e.g. Tedlar). Said UV protection film may be an outermost layer of the textile (i.e. a layer of the textile forming the wind-receiving external surface of the fabric skin).

It may be that the laminate textile comprises an outer coating. Said outer coating may have one or more of the following advantageous properties: high humidity resistance, stable physical and chemical properties in the temperature range −10° C. to 40° C., UV resistance up to a solar radiation intensity of 1000 $Wm^{-2}$, low air porosity in the temperature range −10° C. to 40° C., no water permeability, low light permeability, low radiant heat absorption, puncture resistance, rain erosion resistance, low surface friction, and/or a glass transition temperature ($T_g$) above a minimum value of 40° C.

The wind turbine blade typically weighs more than 1 kg.

It may be that the tensioned fabric is supported along a majority of the length of the wind turbine blade by two or more elongate fabric supporting members. It may be that the flexible external skin is connected to each of the two or more elongate fabric supporting members.

Preferably, at least one of the two or more elongate fabric supporting members is slidably attached to the internal support structure (thereby coupling the flexible external skin to said internal support structure) such that said at least one of the two or more elongate fabric supporting members is (longitudinally) slidable along at least a portion of the length of the wind turbine blade. It may be that some or more of the two or more elongate fabric supporting members are slidably attached to the internal support structure such that said some or more of the elongate fabric supporting members are (longitudinally) slidable along at least a portion of the length of the wind turbine blade. It may be that each of the two or more elongate fabric supporting members is slidably attached to an internal support structure of the wind turbine blade such that each of said one or more of the two or more elongate fabric supporting members is (longitudinally) slidable along at least a portion of the length of the wind turbine blade.

It may also be that one or more of the two or more elongate fabric supporting members is fixedly attached to the internal support structure. It may be that some or more of the two or more elongate fabric supporting members are fixedly attached to the internal support structure. It may be that each of the two or more elongate fabric supporting members is fixedly attached to the internal support structure.

It may be that one of the two or more elongate fabric supporting members is slidably attached to the internal support structure and that another one of the two or more elongate fabric supporting members is fixedly attached to the internal support structure. It may be that one or more of the two or more elongate fabric supporting members is slidably attached to the internal support structure and that another one or more of the two or more elongate fabric supporting members is fixedly attached to the internal support structure.

It may be that the flexible external skin comprising tensioned fabric is supported by the two or more elongate fabric supporting members along at least 70%, or more typically along at least 80%, or more typically along at least 90%, or even more typically along at least 95%, of the length of the wind turbine blade. It may be that the flexible external skin comprising tensioned fabric is supported by the two or more elongate fabric supporting members along the whole length of the wind turbine blade.

It may be that the two or more elongate fabric supporting members extend (longitudinally) along a majority of the length of the wind turbine blade. For example, it may be that the two or more elongate fabric supporting members extend (longitudinally) along at least 70%, or more typically along at least 80%, or more typically along at least 90%, or even more typically along at least 95%, of the length of the wind turbine blade. It may be that the two or more elongate fabric supporting members extend (longitudinally) along the whole length of the wind turbine blade. The longer the two or more elongate fabric supporting members, typically the longer the length of fabric which is supported and thus the fewer the potential number of disruptions to the flexible external skin in use. Alternatively, it may be that the two or more elongate fabric supporting members extend (longitudinally) along only a portion of the length of the wind turbine blade, thereby providing a gap at one or both of a first and second end of each elongate fabric supporting member. The larger the gap provided, typically the longer the distance along which each elongate fabric supporting member is slidable.

It may be that the flexible external skin is slidably attached to each of the two or more elongate fabric supporting members. It may be that the flexible external skin comprises two or more connectors and that the flexible external skin is slidably attached to each of the two or more elongate fabric supporting members by way of said two or more connectors. It may be that said two or more connectors are provided on the interior surface of the flexible external skin. It may be that the interior surface of the flexible external skin is provided with two or more channels, each of the two or more elongate fabric panels being releasably mounted in a respective channel. It may be that each of said two or more channels is formed by a fabric panel (partially) attached to (e.g. bonded to) the interior surface of said external skin.

It may be that each of the two or more elongate fabric supporting members is slidably mounted within a (respective) recess of the internal support structure. For example, it may be that each of the two or more elongate fabric supporting members is slidably mounted within a (respective) groove of the internal support structure. Alternatively, it may be that each of the two or more elongate fabric supporting members is slidably retained within an (respective) aperture of the internal support structure.

It may be that at least one of, and typically each of, the two or more elongate fabric supporting members is slidably mounted within a (respective) recess of at least one of said transverse structural support members. For example, it may be that at least one of, and typically each of, the two or more elongate fabric supporting members is slidably mounted within a (respective) groove of at least one of said transverse structural support members. Alternatively, it may be that at least one of, and typically each of, the two or more elongate fabric supporting members is slidably retained within an (respective) aperture of at least one of said transverse structural support members. It may be that at least one of, and typically each of, the two or more elongate fabric supporting members is slidably mounted within a (respective) recess (e.g. groove and/or aperture) of two or more of said transverse structural support members. It may be that at least one of, and typically each of, the two or more elongate fabric supporting members is slidably mounted within a (respective) recess (e.g. groove and/or aperture) of each of the transverse structural support members.

It may be that each recess (e.g. groove and/or aperture), within which a (respective) one of the two or more elongate fabric supporting member is mounted, is provided on or adjacent to a supporting edge of a respective transverse structural support member (e.g. transverse support panel).

It may be that each of the two or more elongate fabric supporting members comprises an elongate connector. It may be that each of the two or more elongate fabric supporting members consists of an elongate connector. It may be that the flexible external skin comprises two or more fabric panels connected to one another by said two or more elongate connectors along the majority of the length of the wind turbine blade. It may be that the two or more fabric panels are held under tension by the two or more elongate connectors.

It may be that each of said two or more elongate connectors extends longitudinally along the majority of the length of each respective elongate fabric supporting member. For example, it may be that each of said two or more elongate connectors extends longitudinally along the entire length of each respective elongate fabric supporting member. Accordingly, it may be that each of said two or more elongate connectors extends longitudinally along the majority of the length of the wind turbine blade. For example, it may be that each of the two or more elongate connectors extends longitudinally along at least 70%, more typically along at least 80%, more typically at least along 90%, or even more typically along at least 95%, of the length of the wind turbine blade. It may be that said two or more elongate connectors extend (longitudinally) along the whole length of the wind turbine blade.

It may be that the two or more elongate connectors are low profile connectors. For example, it may be that the two or more elongate connectors have a low height profile relative to the wind-receiving external surface of the flexible external skin. Such low profile connectors typically do not protrude substantially beyond the wind-receiving external surface. For example, low profile connectors typically do not protrude more than 1 cm above the wind-receiving external surface, or more typically more than 0.5 cm above the wind-receiving external surface. It may be that said low profile connectors do not protrude above the wind-receiving external surface (at all). The lower the profile of the two or more elongate connectors, the less they disrupt the flow of air (i.e. wind) over the wind turbine blade when in use.

It may be that the two or more fabric panels are releasably connected to one another along the majority of the length of the wind turbine blade by the two or more elongate connectors. This typically allows the fabric panels to be removed and replaced, for example if the panels are damaged.

It may be that the two or more fabric panels together form a (substantially continuous) fabric surface (around the wind turbine blade along the majority of the length of said wind turbine blade) which is interrupted (only) by external surfaces of the two or more elongate connectors, for example. It may be that the two or more elongate connectors are narrow (for example, relative to a width of the two or more fabric panels). For example, it may be that a width of each of the two or more elongate connectors (in a direction around the wind turbine blade perpendicular to a longitudinal axis of said blade) is less than 10% of the width of each of the two or more fabric panels connectors (in said direction around the wind turbine blade perpendicular to the longitudinal axis of said blade), or more typically less than 5% of said width of each of the two or more fabric panels. It may be that the two or more elongate connectors are (sufficiently) narrow such that air (i.e. wind) flowing over the flexible external skin flows substantially similarly to (for example the deflection of said air (i.e. wind) by said external skin is substantially similar to) air (i.e. wind) flowing over a continuous fabric surface having the same three-dimensional shape as said external skin. It may be that the two or more elongate connectors are (sufficiently) narrow such as to avoid significant deflection of air (i.e. wind) flowing over adjacent one or more fabric panels.

In practice, the flexible external skin may be formed in part by the two or more elongate connectors. For example, it may be that the flexible external skin is formed by the two or more fabric panels and any portions of the two or more elongate connectors between said two or more fabric panels. However, in some embodiments the flexible external skin is formed entirely by the two or more fabric panels.

It may be that said external skin comprises a significant proportion (e.g. a majority) of an external surface of the wind turbine blade. It may be that the flexible external skin comprises at least 70%, or more typically at least 80%, or even more typically at least 90%, of the external surface of the wind turbine blade. For example, it may be that said external skin comprises the entire external surface of the wind turbine blade.

It may be that each of the two or more elongate connectors comprises first and second elongate channels, the first said channel retaining an edge of one of the two or more fabric panels and the second said channel retaining an edge of another of the two or more fabric panels. It may be that said first and second channels resist sliding of the retained fabric panels in a direction perpendicular to the length of the wind turbine blade (i.e. perpendicular to the longitudinal axis of the wind turbine blade). It may be that said first and second channels permit sliding of the retained fabric panels in a longitudinal direction along the length of the wind turbine blade (i.e. parallel to the longitudinal axis of the wind turbine blade). It may be that the edge of the one of the two or more fabric panels and the edge of the another of the two or more fabric panels are both bolt rope terminated edges of said respective fabric panels.

The two or more elongate connectors may be made of one or more (rigid) plastics materials. The two or more elongate connectors may be made of metal. The two or more elongate connectors may be made of one or more composite materials. For example, the two or more elongate connectors may be made of glass-reinforced plastic (GRP) (i.e. fibreglass) and/or or carbon-fibre-reinforced plastic (CRP).

It may be that the two or more elongate connectors extend from the hub end portion to the wind turbine blade tip portion. Alternatively, it may be that the two or more elongate connectors extend from proximate the hub end portion to proximate the wind turbine blade tip portion.

It may be that the two or more fabric panels extend from the hub end portion to the wind turbine blade tip portion. Alternatively, it may be that the two or more fabric panels extend from proximate the hub end portion to proximate the wind turbine blade tip portion.

It may be that the external skin of the wind turbine blade is defined by two or more fabric panels, each of said two or more fabric panels having a first edge and a second edge different from said first edge, wherein the first edge of each said panel is connected to the second edge of one other said panel along the majority of the length of the wind turbine blade by one elongate connector, wherein the second edge of each said panel is connected to the first edge of another said panel along the majority of the length of the wind turbine blade by one other elongate connector, and wherein each of said two or more panels is held under tension by said elongate connectors.

For example, it may be that the flexible external skin is defined by first and second fabric panels, each of said first and second fabric panels having a first edge and a second edge different from said first edge, wherein the first edge of the first panel is connected to the second edge of the second panel along the majority of the length of the wind turbine blade by a first elongate connector and the first edge of the second panel is connected to the second edge of the first panel along the majority of the length of the wind turbine blade by a second elongate connector. Alternatively, it may be that the flexible external skin is defined by first, second and third fabric panels, each of said first, second and third fabric panels having a first edge and a second edge different from said first edge, wherein the first edge of the first panel is connected to the second edge of the second panel along the majority of the length of the wind turbine blade by a first elongate connector, wherein the first edge of the second panel is connected to the second edge of the third panel along the majority of the length of the wind turbine blade by a second elongate connector, and wherein the first edge of the third panel is connected to the second edge of the first panel along the majority of the length of the wind turbine blade by a third elongate connector. Optionally, said external skin may comprise fourth, fifth, sixth, seventh, eighth, ninth and/or tenth further fabric panels, in which case each further fabric panel typically has a first edge and a second edge different from said first edge, the first edge of each said further fabric panel typically being connected to a second edge of one other said fabric panel (i.e. one of the first, second, third, fourth, fifth, sixth, seventh, eighth, ninth or tenth fabric panels) along the majority of the length of the wind turbine blade by an elongate connector, and the second edge of each said further fabric panel typically being connected to the first edge of another said fabric panel (i.e. one of the first, second, third, fourth, fifth, sixth, seventh, eighth, ninth or tenth fabric panels) along the majority of the length of the wind turbine blade by another elongate connector.

It may be that the first edge and the second edge of each of the two or more fabric panels extend along the majority of the length of the wind turbine blade. It may be that the first edge and the second edge of each of the two or more fabric panels extend along the whole length of the wind turbine blade. It may be that the first edge and the second edge of each of the two or more fabric panels extend from the hub end portion to the wind turbine blade tip portion. Alternatively, it may be that the first edge and the second edge of each of the two or more fabric panels extend from proximate the hub end portion to proximate the wind turbine blade tip portion.

Accordingly, it may be that a connection between each pair of adjacent fabric panels from the said two or more fabric panels (said connection formed by one or more of the two or more elongate connectors) extends along the majority of the length of the wind turbine blade. It may be that said connection between each pair of adjacent fabric panels from the said two or more fabric panels extends along the whole the length of the wind turbine blade. It may be that the connection between each pair of adjacent fabric panels from the said two or more fabric panels extends from the hub end portion to the wind turbine blade tip portion. Alternatively, it may be that the connection between each pair of adjacent fabric panels from the said two or more fabric panels extends from proximate the hub end portion to proximate the wind turbine blade tip portion.

It may be that the wind turbine blade has three or more fabric panels and a corresponding number of elongate connectors. It may be that the wind turbine blade has four or more fabric panels and a corresponding number of elongate connectors. It may be that the wind turbine blade has five or more fabric panels and a corresponding number of elongate connectors. Said two or more, three or more, four or more, or five or more fabric panels are typically connected to one another around the wind turbine blade along the majority of the length of the wind turbine blade.

It may be that the wind turbine blade has ten or fewer fabric panels and a corresponding number of elongate connectors. It may be that the wind turbine blade has nine or fewer fabric panels and a corresponding number of elongate connectors.

It may be that the wind turbine blade has eight or fewer fabric panels and a corresponding number of elongate connectors. It may be that the wind turbine blade has seven or fewer fabric panels and a corresponding number of elongate connectors. It may be that the wind turbine blade has six or fewer fabric panels and a corresponding number of elongate connectors. It may be that the wind turbine blade has five or fewer fabric panels and a corresponding number of elongate connectors. Said ten or fewer, nine or fewer, eight or fewer, seven or fewer, six or fewer, or five or fewer fabric panels are typically connected to one another around the wind turbine blade along the majority of the length of the wind turbine blade.

For example, it may be that the wind turbine blade has more than two but fewer than six said fabric panels and more than two but fewer than six said elongate connectors.

The fewer the number of disruptions to the wind-receiving external surface of the flexible external skin, the smoother the flow of air (i.e. wind) over the flexible external skin and thus the greater the efficiency of the wind turbine to which the wind turbine blade may be connected. Since the elongate connectors also hold the fabric panels under tension, by keeping the number of fabric panels low, fewer adjustments to the fabric tension are typically required.

It may be that one of the two or more fabric panels forms a continuous fabric surface across the leading edge of the wind turbine blade. In use, this typically allows air (i.e. wind) to flow uninterrupted over the leading edge. The flow of air (i.e. wind) over the leading edge is thereby typically not disrupted by any of the two or more elongate connectors. Restricting turbulence in the flow as air (i.e. wind) flows onto and across the flexible external skin of the wind turbine blade improves the efficiency of lift generation.

It may be that one of the two or more fabric panels forms a continuous fabric surface across the trailing edge of the wind turbine blade. In use, this typically allows air (i.e. wind) to flow uninterrupted over the trailing edge. The flow of air (i.e. wind) over the trailing edge is thereby typically not disrupted by any of the two or more elongate connectors. Restricting turbulence in the flow of air (i.e. wind) allows air flowing over the wind turbine blade to leave the wind-receiving external surface of the flexible external skin smoothly, thereby improving the efficiency of lift generation.

It may be that at least a portion of the suction surface is convex. For example, it may be that the entirety of the suction surface is convex. It may be that the at least a portion of the internal support structure is adjustable to vary the convexity of the suction surface.

It may be that at least a portion of the pressure surface is concave. For example, it may be that the entirety of the pressure surface is concave. It may be that the at least a portion of the internal support structure is adjustable to vary the concavity of the pressure surface.

It may be that the pressure surface comprises at least one concave portion and at least one convex portion. A line of inflection may extend longitudinally along the pressure surface marking a boundary between regions of different surface curvature. It may be that at least one of the two or more elongate connectors extends along the line of inflection of the concave portion of the pressure surface.

A second aspect of the invention provides a wind turbine comprising at least one wind turbine blade according to any one embodiment of the first aspect of the invention. The wind turbine may comprise a plurality of wind turbine blades, each said wind turbine blade according to any one embodiment of the first aspect of the invention. The wind turbine may comprise three wind turbine blades, each according to any one embodiment of the first aspect of the invention.

Optional or essential features of any one aspect of the invention are also, mutatis mutandis, optional features of any other aspect of the invention.

DESCRIPTION OF THE DRAWINGS

An example embodiment of the present invention will now be illustrated with reference to the following Figures in which.

DETAILED DESCRIPTION OF AN EXAMPLE EMBODIMENT

First Example Embodiment

Figure 1:
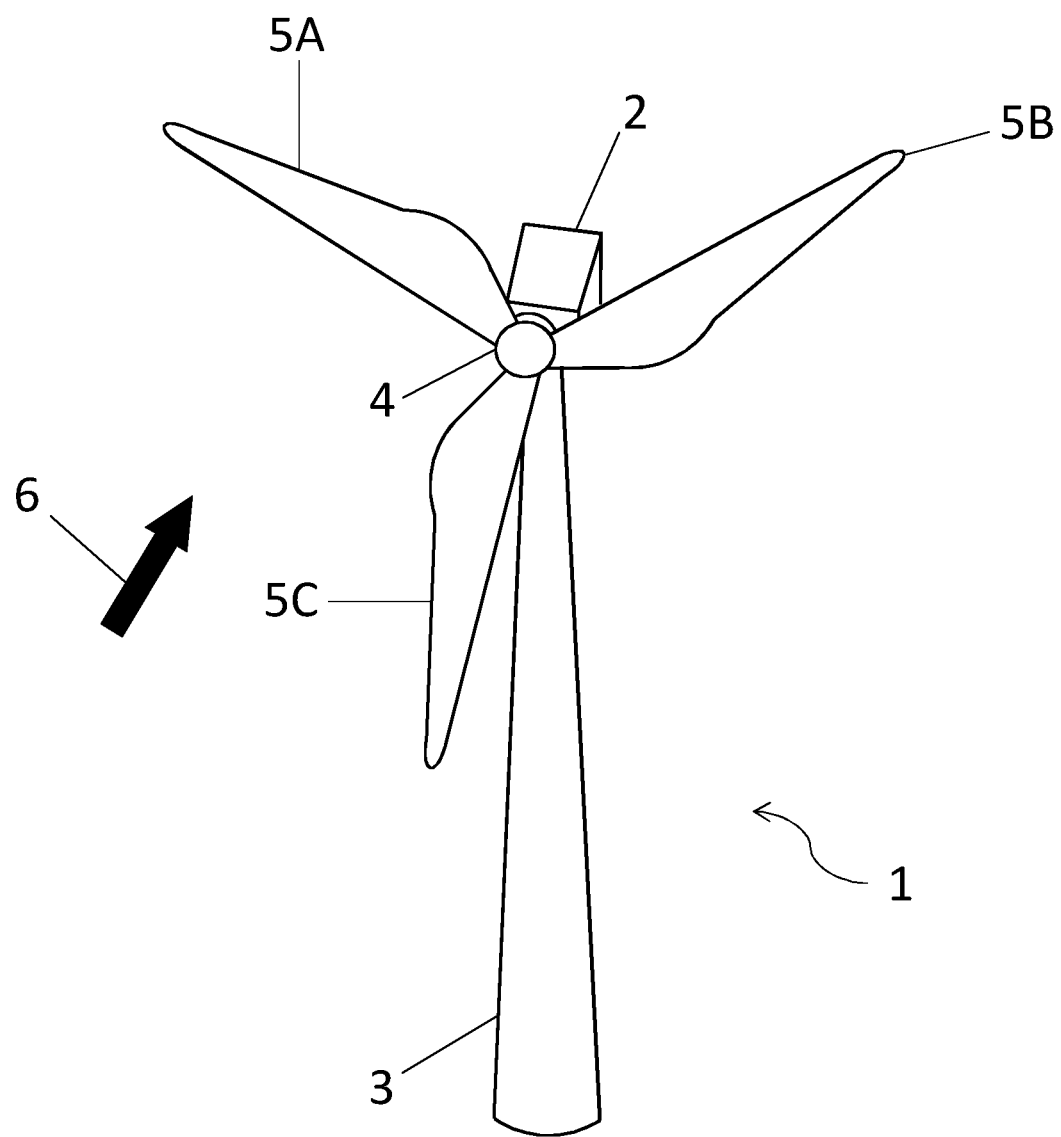
FIG. 1 is a perspective view of a horizontal axis wind turbine.

FIG. 1 shows a horizontal axis wind turbine 1 comprising a nacelle 2 supported on top of a mast 3. The nacelle 2 further supports a hub 4. Three substantially identical wind turbine blades 5A, 5B and 5C extend from said hub 4, together forming a wind turbine rotor.

Figure 2:
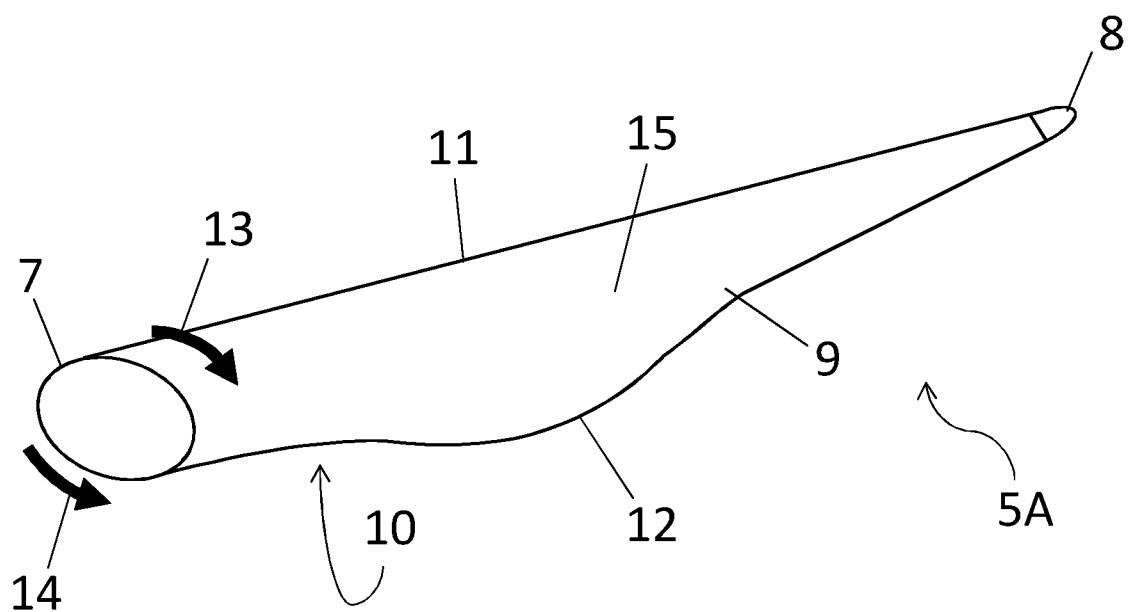
FIG. 2 is a perspective view of a wind turbine blade according to a first example embodiment of the invention.

Wind turbine blade 5A, separate from the rest of the wind turbine 1, is shown in more detail in FIG. 2. Wind turbine blade 5A extends between a hub end 7 and a blade tip 8. The hub end 7 is connected to the hub 4 when in use. Wind turbine blade 5A has a three-dimensional aerodynamic shape comprising a suction surface 9 and a pressure surface 10 which both extend between a leading edge 11 and a trailing edge 12 of the wind turbine blade 5A.

A wind-receiving fabric surface 15 extends around the wind turbine blade 5A. The wind-receiving surface 15 includes both the suction surface 9 and the pressure surface 10. The wind-receiving surface 15 is formed from an elongate fabric sock 15 which extends along a length of the wind turbine blade 5A from the hub end 7 to the wind turbine blade tip 8 and which wraps around the wind turbine blade 5A.

As shown in FIG. 1, in use, wind turbine 1 is typically oriented with its rotor facing into the wind such that air flows in a direction indicated by arrow 6 towards the rotor. A portion of the air blowing in direction 6 towards the wind turbine 1 subsequently flows across the aerodynamic surface of each wind turbine blade 5A, 5B and 5C. As shown in FIG. 2, air blowing onto and across the aerodynamic surface of wind turbine blade 5A generally flows from the leading edge 11 to the trailing edge 12 across the suction surface 9 in a direction indicated by arrow 13. Air also generally flows from the leading edge 11 to the trailing edge 12 across the pressure surface 10 in a direction indicated by arrow 14. A pressure gradient between air flowing above the suction surface and air flowing below the pressure surface generates a lift force which causes the wind turbine blade 5A, and the hub 4 to which it is connected in use, to rotate. As air flows over an aerodynamic surface of each of the wind turbine blades 5A, 5B, 5C, a lift force is exerted on each wind turbine blade, thereby causing each wind turbine blade, and the hub 4 from which they extend, to rotate. Rotation of the hub 4 drives rotation of a shaft inside the nacelle 2 from which an electricity generator inside nacelle 2 generates electricity.

Figure 3:
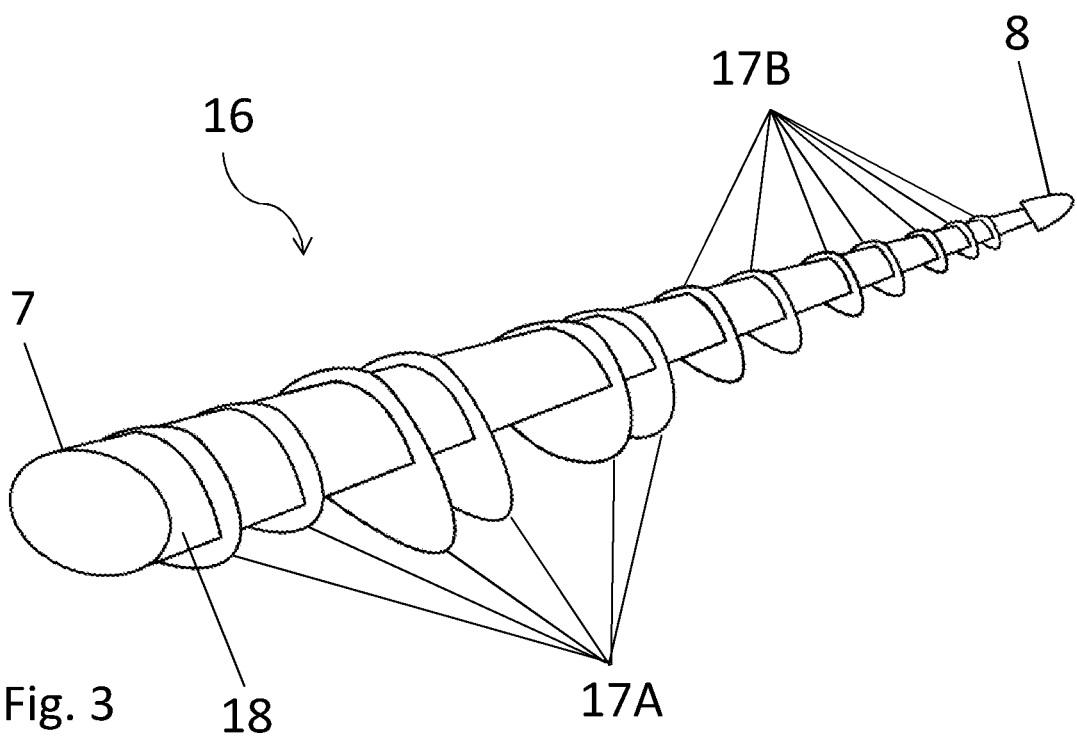
FIG. 3 is a perspective view of an internal support structure of the wind turbine blade of FIG. 2.

FIG. 3 shows an internal skeleton structure 16 of the wind turbine blade 5A when the fabric sock 15 has been removed. The internal structure 16 consists of fixed composite sandwich rib panels 17A and articulated composite sandwich rib panels 17B, each extending from a carbon fibre pole 18. The carbon fibre pole 18 has an elliptical cross section. The width of the carbon fibre pole 18 (i.e. the elliptical cross-sectional area of the pole 18) varies continuously along the length of the wind turbine blade 5A. The carbon fibre pole 18 is thicker towards the hub end 7 and it is thinner towards the wind turbine blade tip 8. Each of the rib panels 17A and 17B consist of a thin composite sandwich plate having an aerodynamic profile. The shapes of the rib panels 17A and 17B vary along the length of the wind turbine blade 5A. The rib panels 17A and 17B support the fabric wind receiving surface 15 of the wind turbine blade 5A, and thus the variation in the shapes of said rib panels 17A and 17B defines the aerodynamic profile of the overall blade 5A.

Figure 4:
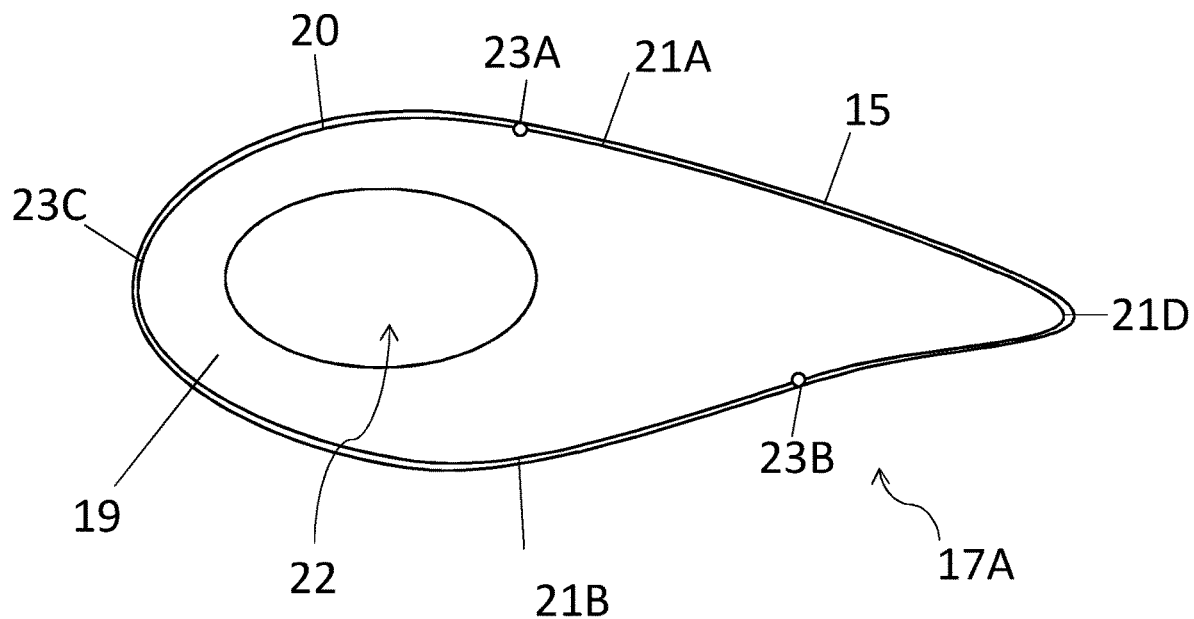
FIG. 4 is a cross section through a transverse rib panel of the internal support structure of FIG. 3.

FIG. 4 shows one of rib panels 17A in more detail. Rib panel 17A consists of a composite sandwich panel 19 which, when viewed along a longitudinal axis of the wind turbine blade 5A from the hub end 7 to the wind turbine blade tip 8, has an aerodynamic profile defined by a panel edge 20. Panel edge 20 can be divided into suction surface edge portion 21A, pressure surface edge portion 21B, leading edge portion 21C and trailing edge portion 21D. An elliptical aperture 22 is provided through the thickness of the composite sandwich panel 19 configured to provide an interference fit around the elliptical pole 18.

When in use, the fabric sock 15 is wrapped around and is supported by, in part, rib panel 17A. Fabric sock 15 is coupled to each of the rib panels 17A,17B along the longitudinal length of the wind turbine blade 5A by two elongate fabric supporting members 23A and 23B. Elongate fabric supporting member 23A is slidably attached to the suction surface edge portion 21A of composite sandwich panel 19. Elongate fabric supporting member 23B is slidably attached to the pressure surface edge portion 21B of composite sandwich panel 19.

Figure 5:
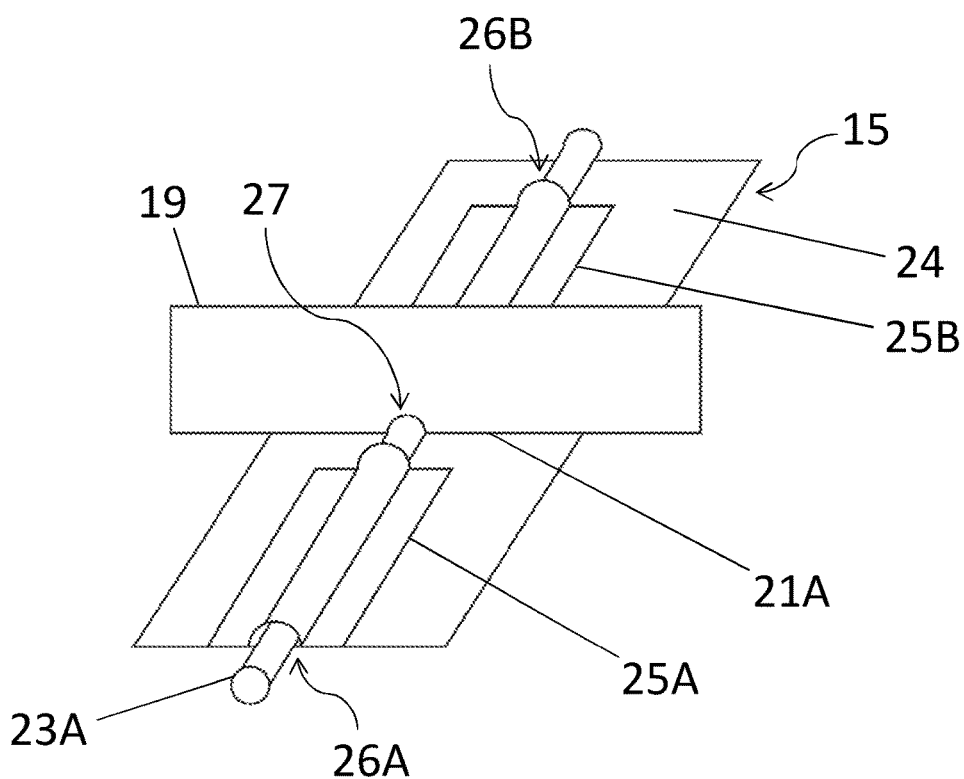
FIG. 5 is a more detailed perspective view of a connection between an elongate fabric supporting member, a fabric skin and the transverse rib panel of FIG. 4.

FIG. 5 shows in greater detail how fabric sock 15, elongate fabric supporting member 23A and composite sandwich panel 19 are connected to one another.

Elongate fabric supporting member 23A is slidably connected to an interior surface 24 of fabric sock 15 by fabric pockets 25A and 25B bonded to the interior surface 24. The fabric pockets 25A and 25B each form elongate open channels 26A and 26B respectively along which the elongate fabric supporting member 23A is slidable. An aperture 27 is also formed in the suction surface edge portion 21A of composite panel 19 through which elongate fabric supporting member 23A is slidable. Elongate fabric supporting member 23A is therefore slidably retained within fabric pockets 25A and 25B and aperture 27. Elongate fabric supporting member 23A, fabric sock 15 and composite rib panel 19 are therefore all slidable with respect to one another in a direction along the length of elongate fabric supporting member 23A (and also, therefore, along the length of the wind turbine blade 5A). Elongate fabric supporting member 23A is similarly slidably coupled to each composite rib panel 17A,17B and to the interior surface 24 of the fabric sock 15 adjacent to and on either side of each composite rib panel 17. Elongate fabric supporting member 23B is similarly slidably coupled to the pressure surface edge 21B of each composite rib panel 17A,17B and to the interior surface 24 of the fabric sock 15 adjacent to and on either side of each composite rib panel 17.

Figure 6:
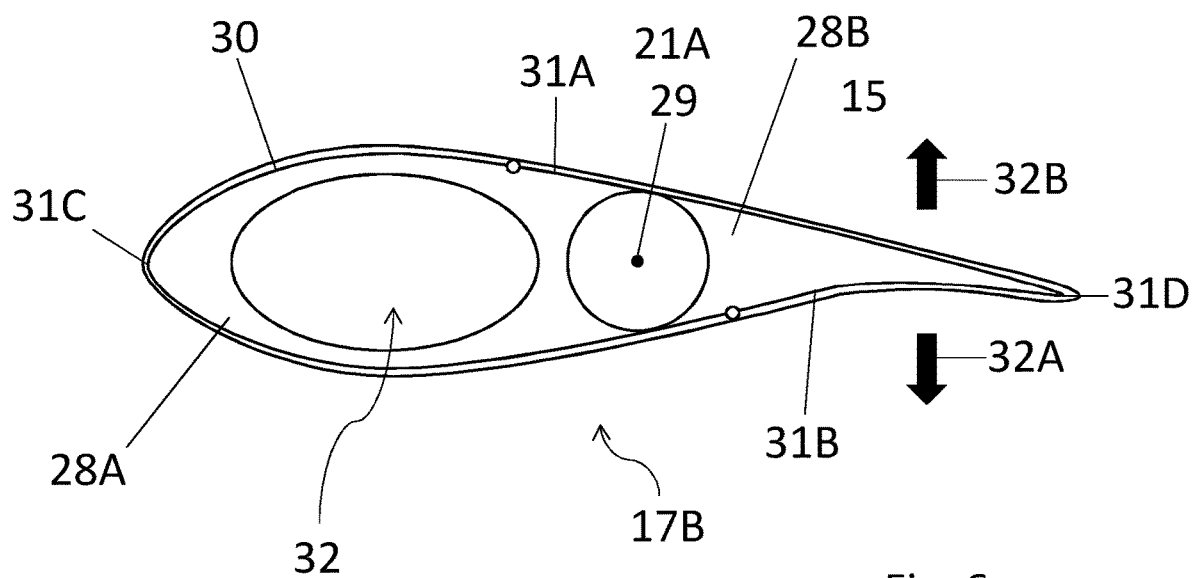
FIG. 6 is a cross section through an articulated transverse rib panel of the internal support structure of FIG. 3.

FIG. 6 shows one of the articulated rib panels 17B in more detail. Rib panel 17B consists of a fixed composite sandwich panel portion 28A and an articulated composite sandwich panel portion 28B. Articulated panel portion 28B has a rounded end which is rotatably mounted within a groove of fixed panel portion 28A such that articulated panel portion 28B can rotate about pivot point 29. When viewed along a longitudinal axis of the wind turbine blade 5A from the hub end 7 to the wind turbine blade tip 8, rib panel 17B has an aerodynamic profile defined by a panel edge 30. Panel edge 30 can be divided into suction surface edge portion 31A, pressure surface edge portion 31B, leading edge portion 31C and trailing edge portion 31D. An elliptical aperture 32 is provided through the thickness of the fixed panel 28A configured to provide an interference fit around the elliptical pole 18. Rotation of articulated panel portion 28B about pivot point 29 permits movement of the trailing edge portion 31D of the rib panel 18B in the directions indicated by arrows 32A and 32B.

Figure 7:
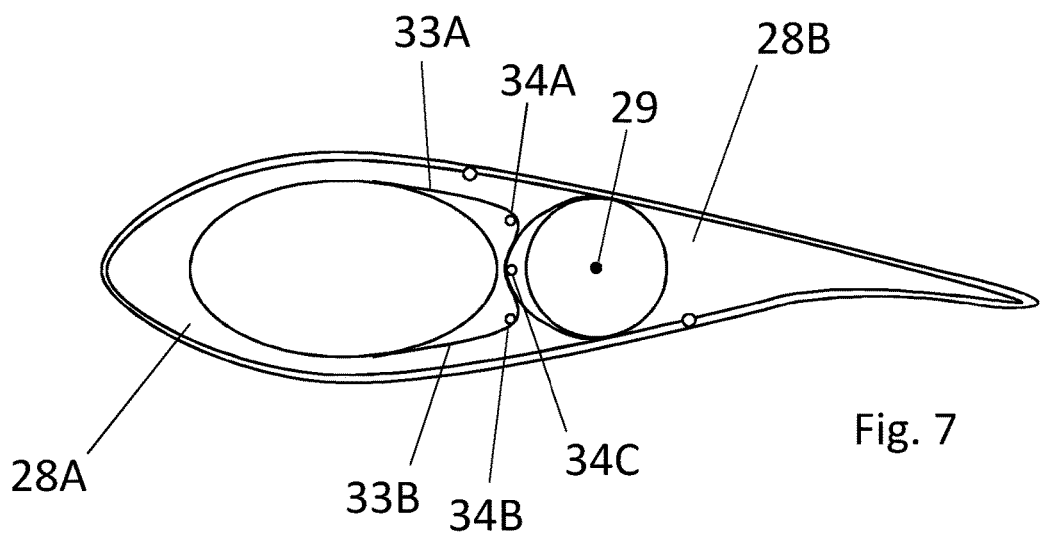
FIG. 7 shows the cross section through the articulated transverse rib panel of FIG. 6 including control cabling.

In use, the orientation of articulated panel portion 28B with respect to fixed panel portion 28A can be controlled by way of a system of cabling as shown in FIG. 7. Control cables 33A and 33B are fixedly attached to the rounded end of articulated panel portion 28B and are coupled to a control system (not shown) mounted at the wind turbine blade hub 4 through a series of turning blocks 34A, 34B and 34C. The control system incorporates a stepper motor capable of pushing and pulling the control cables, thereby exerting a torque on the rounded end of articulated panel portion 28B and consequently causing rotation of said articulated panel with respect to the fixed panel portion 28B.

When in use, the fabric sock 15 is wrapped around and is supported by, in part, rib panel 17B. Fabric sock 15 is coupled to each of the rib panels 17B along the longitudinal length of the wind turbine blade 5A by the two elongate fabric supporting members 23A and 23B. Elongate fabric supporting member 23A is slidably attached to the suction surface edge portion 31A of composite sandwich panel 28B. Elongate fabric supporting member 23B is slidably attached to the pressure surface edge portion 31B of composite sandwich panel 28A.

Figure 8:
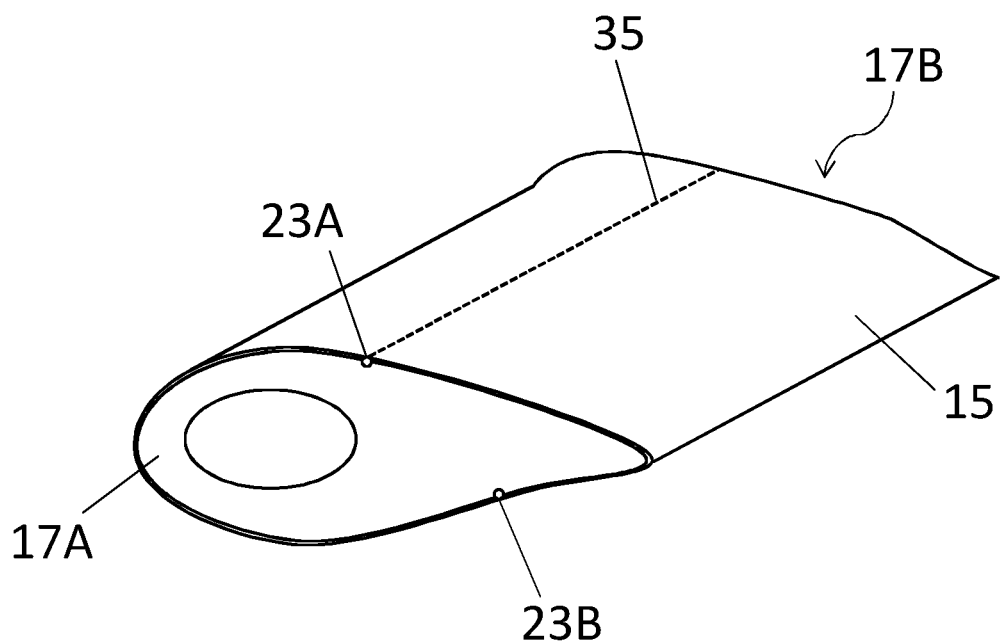
FIG. 8 is a perspective view of a section of the wind turbine blade of FIG. 2 between the transverse rib panels of FIGS. 4 and 7.

FIG. 8 shows a portion of the wind turbine blade 5A between adjacent rib panels 17A and 17B. Elongate fabric supporting members 23A and 23B are slidably attached to each rib panel in approximately equivalent positions around the panel edge of each said rib panel. Elongate fabric supporting members 23A and 23B extend between each rib panel (dashed line 35 indicates the line along which elongate fabric supporting member 23A extends between rib panels 17A and 17B) and therefore support the fabric sock 15 between each rib panel. Fabric sock 15 is dimensioned and positioned so as to be pulled taught between adjacent rib panels along the longitudinal axis of the wind turbine blade 5A. The wind-receiving surface 15 formed by fabric sock 15 supported by rib panels 16A and 16B, and by elongate fabric supporting members 23A and 23B, is therefore a taught, smooth, aerodynamic surface presenting few interruptions or features capable of disrupting the smooth flow of air thereacross.

Because the fabric sock 15, the elongate fabric supporting members 23A and 23B and the internal support structure 16 are slidably coupled to one another, in use, each respective element may slide along the length of the wind turbine blade 5A as said wind turbine blade 5A deforms under the aerodynamic forces exerted on it and the hub 4 rotates. The wind receiving fabric surface 15 is therefore free to deform in order to accommodate bending of the internal support structure 16 without said fabric surface 15 sagging between adjacent rib panels 17 because it is supported by the elongate fabric supporting members 23A and 23B, and because said elongate fabric supporting members 23A and 23B slide along the length of the wind turbine blade 5A as the structure bends.

In addition, because the articulated rib panel portions 28B of rib panels 17B are able to be rotated under the control of the control system, the aerodynamic profile of the wind turbine blade may be actively controlled in use. As each articulated rib panel portion 17B rotates, the fabric sock 15 slides or deforms to accommodate the adjustment, thereby varying the external shape of the wind turbine blade.

Figure 9:
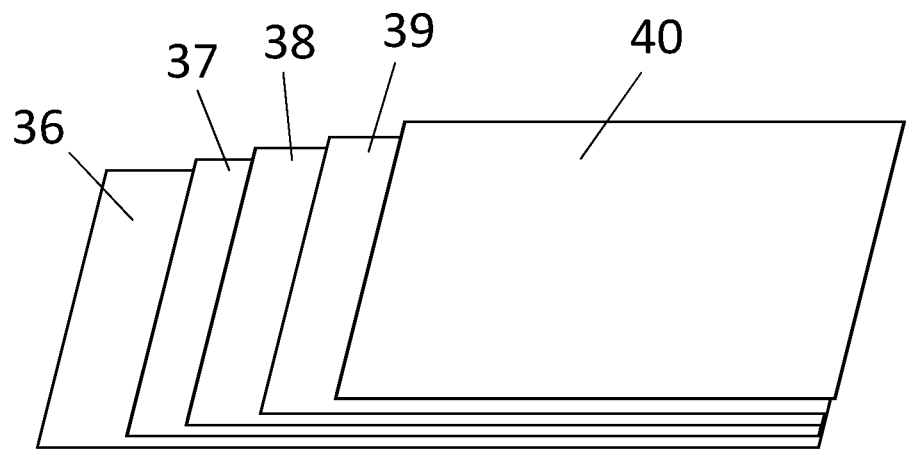
FIG. 9 is an exploded view of a laminated structure of the fabric skin of the wind turbine blade of FIG. 2.

Fabric sock 15 is formed from a laminated textile material. FIG. 9 shows the laminate structure of this textile material in more detail. The textile material comprises, in order, a Mylar (resin polyethylene terephthalate) base layer 36, a Technora (aramid) and Vectran (liquid crystal polymer fibre) woven composite layer 37, a Mylar (resin polyethylene terephthalate) film 38, a first Tedlar (polyvinyl fluoride) film 39 and a second Tedlar (polyvinyl fluoride) film 40.

Figure 10:
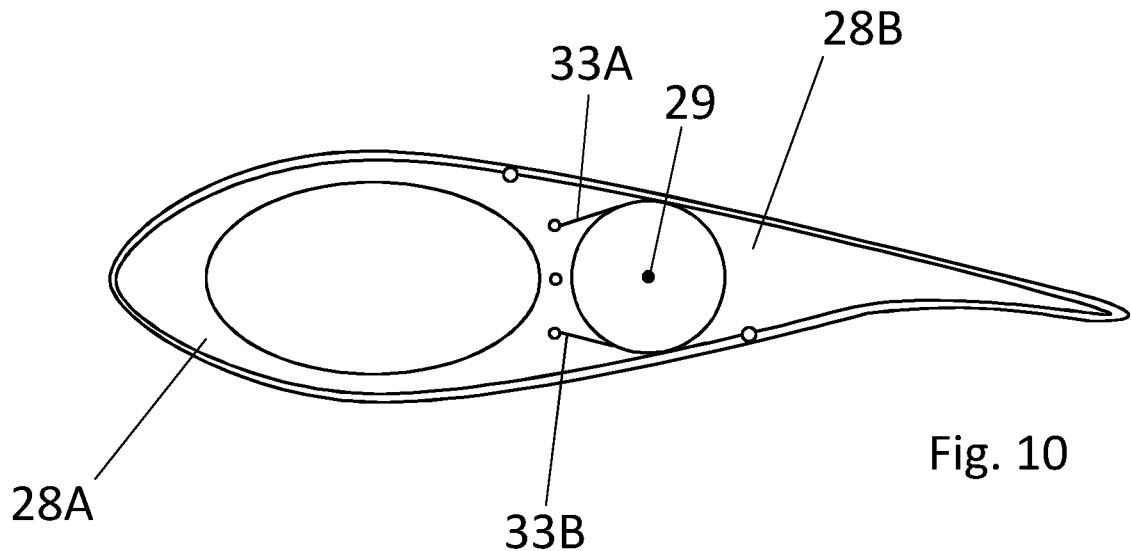
FIG. 10 shows the cross section through the articulated transverse rib panel of FIG. 6 including piezoelectric control actuators.
Figure 11:
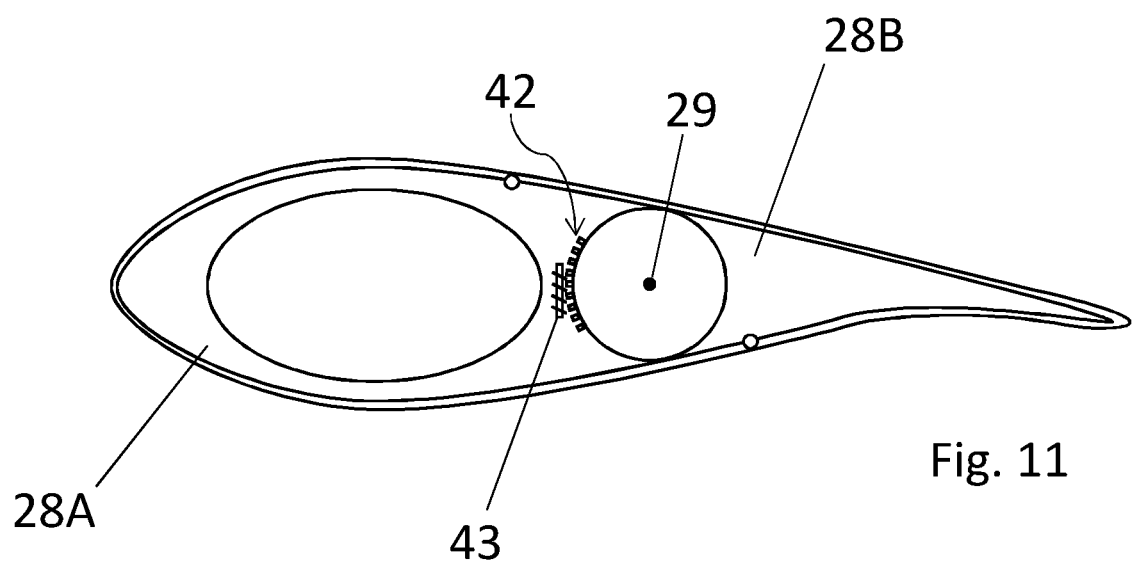
FIG. 11 shows the cross section through the articulated transverse rib panel of FIG. 6 including a worm and wheel drive.

In variations of the invention, the articulated rib panels may be actively controlled in a number of different ways. For example, as shown in FIG. 10, piezoelectric actuators 41A and 41B may be used to adjust the rotation of the articulated rib panel portions. Alternatively, a direct drive mechanism (e.g. a worm and wheel drive) may be used, as shown in FIG. 11, wherein the rounded end of the articulated panel portion is provided with teeth configured to mate with a corresponding helical thread of a drive screw located on the adjacent retaining surface of the fixed panel portion.

Alternatively, active control of the articulated rib panels may be replaced by passive control mechanisms. For example, each articulated panel portion may be rotatably coupled to its respective fixed panel portion by one or more springs. The articulated panel portion may consequently rotate when the external pressure exerted on the wind turbine blade exceeds a threshold such that the one or more springs compress or expand. The springs would be biased so as to return the articulated rib panel portion to a neutral position when the external pressure falls below the threshold.

It may be that only one of the rib panels is articulated and the remaining rib panels remain fixed. Alternatively, it may be that two or more (e.g. several) of the rib panels are articulated. The articulated rib panels may be positioned adjacent to one another, thereby forming an articulated portion of the wind turbine blade. This articulated portion is typically provided towards the wind turbine blade tip end of the wind turbine blade.

Further variations and modifications may be made within the scope of the invention herein disclosed.

The invention claimed is:

1. A wind turbine blade, comprising:
a flexible external skin and an internal support structure, together defining an aerodynamic profile of the wind turbine blade,
wherein at least a portion of the internal support structure is adjustable to thereby vary said aerodynamic profile,
wherein the internal support structure comprises a longitudinal structural support member and a plurality of transverse structural support members arranged along the length of the longitudinal structural support member, and
wherein one or more of the transverse structural support members is formed of a first portion which is fixed and a second portion which is rotatably or hingedly mounted on the first portion, thereby providing the adjustability of the internal support structure.

2. The wind turbine blade according to claim 1, wherein said at least a portion of the internal support structure is adjustable to thereby vary the aerodynamic profile of the wind turbine blade in cross-section through the wind turbine blade perpendicular to a longitudinal axis of the wind turbine blade.

3. The wind turbine blade according to claim 1, wherein the at least a portion of the internal support structure is adjustable to vary the aerodynamic profile of the wind turbine blade along at least 10% of the length of the wind turbine blade.

4. The wind turbine blade according to claim 1, wherein the flexible external skin comprises a suction surface and a pressure surface both extending between a leading edge and a trailing edge of the wind turbine blade, the suction surface and the pressure surface each forming part of the aerodynamic profile of the wind turbine blade.

5. The wind turbine blade according to claim 4, wherein the at least a portion of the internal support structure is adjustable to vary an angle between a tangent to the suction surface and a tangent to the pressure surface.

6. The wind turbine blade according to claim 4, wherein the at least a portion of the internal support structure is adjustable to vary an orientation of the trailing edge with respect to the leading edge.

7. The wind turbine blade according to claim 1, wherein the internal support structure comprises a plurality of transverse structural support members, each extending substantially perpendicular to the longitudinal axis of the longitudinal structural support member, the plurality of transverse structural support members including said at least one articulated transverse structural support member.

8. The wind turbine blade according to claim 1, wherein the internal support structure comprises a plurality of articulated transverse structural support members, at least a portion of each said articulated transverse structural support member being movable to thereby vary the aerodynamic profile of the wind turbine blade.

9. The wind turbine blade according to claim 1, wherein the or each articulated transverse structural support member comprises a fixed portion and a movable portion, the fixed portion being fixedly attached to or integral with the longitudinal structural support member, and the movable portion being coupled to the fixed portion such that the movable portion is movable relative to the fixed portion.

10. The wind turbine blade according to claim 9, wherein the movable portion is rotatably coupled to the fixed portion such that the movable portion is rotatable relative to the fixed portion.

11. The wind turbine blade according to claim 10, wherein the movable portion is rotatable through a total angular range of at least 5°.

12. The wind turbine blade according to claim 1 comprising a distal region which is adjustable to vary the aerodynamic profile of the wind turbine blade and a proximal region which is not adjustable, each of the distal and proximal regions extending along at least 10% of the length of the wind turbine blade.

13. The wind turbine blade according to claim 1 further comprising a controller operable to control adjustment of the at least a portion of the internal support structure which is adjustable to vary the aerodynamic profile of the wind turbine blade.

14. The wind turbine blade according to claim 13, wherein the controller is coupled to one or more individually controllable articulated transverse structural support members.

15. The wind turbine blade according to claim 13 further comprising one or more sensors, wherein the controller is operable to determine one or more adjustments of the internal support structure taking into account one or more sensor outputs from the one or more sensors.

16. The wind turbine blade according to claim 1, wherein the flexible external skin comprises tensioned fabric.

17. The wind turbine blade according to claim 16, wherein the tensioned fabric is supported along a majority of the length of the wind turbine blade by two or more elongate fabric supporting members.

18. The wind turbine blade according to claim 17, wherein at least one of the two or more elongate fabric supporting members is slidably attached to the internal support structure such that said at least one of the two or more elongate fabric supporting members is slidable along at least a portion of the length of the wind turbine blade.

19. A wind turbine comprising at least one wind turbine blade according to claim 1.

20. A wind turbine blade, comprising:
- a flexible external skin and an internal support structure, together defining an aerodynamic profile of the wind turbine blade,
- wherein at least a portion of the internal support structure is adjustable to thereby vary said aerodynamic profile,
- wherein the internal support structure comprises a longitudinal structural support member and a plurality of transverse structural support members arranged along the length of the longitudinal structural support member, and
- wherein one or more of the transverse structural support members is formed of a first portion which is fixed and a single second portion which is rotatably or hingedly mounted on the first portion, thereby providing the adjustability of the internal support structure.

\* \* \* \* \*